US009477782B2

United States Patent
Marantz et al.

(10) Patent No.: US 9,477,782 B2
(45) Date of Patent: Oct. 25, 2016

(54) USER INTERFACE MECHANISMS FOR QUERY REFINEMENT

(71) Applicant: Microsoft Corporation, Redmond, WA (US)

(72) Inventors: Daniel Marantz, Woodinville, WA (US); Anjali Muralidhar, Seattle, WA (US); Aaron C. Yuen, Bellevue, WA (US); Bartosz L. Rakowski, Croydon (GB); Darrin E. Eide, Bellevue, WA (US); Gaurang Prajapati, Redmond, WA (US); Parthasarathy Govindarajen, Bothell, WA (US); Arun K. Sacheti, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 150 days.

(21) Appl. No.: 14/222,405

(22) Filed: Mar. 21, 2014

(65) Prior Publication Data
US 2015/0269176 A1    Sep. 24, 2015

(51) Int. Cl.
G06F 17/30    (2006.01)

(52) U.S. Cl.
CPC ..... *G06F 17/3097* (2013.01); *G06F 17/30392* (2013.01); *G06F 17/30401* (2013.01)

(58) Field of Classification Search
USPC ................................. 707/766, 767
See application file for complete search history.

(56) References Cited

U.S. PATENT DOCUMENTS

| 5,138,669 | A | 8/1992 | Shimura et al. |
| 6,772,150 | B1 | 8/2004 | Whitman et al. |
| 7,146,362 | B2 * | 12/2006 | Allen ................ G06F 17/30864 |
| 7,809,714 | B1 | 10/2010 | Smith |
| 7,870,147 | B2 | 1/2011 | Bailey et al. |
| 7,984,004 | B2 | 7/2011 | Andrew et al. |
| 8,086,590 | B2 * | 12/2011 | Zheng ................ G06F 17/3097 |
| | | | 707/706 |
| 8,346,764 | B1 * | 1/2013 | Rosenoff ................ G06Q 50/18 |
| | | | 707/723 |
| 8,346,792 | B1 | 1/2013 | Baker et al. |
| 8,412,728 | B1 | 4/2013 | Roskind |
| 8,538,982 | B2 * | 9/2013 | Effrat .................. G06F 17/3064 |
| | | | 707/723 |
| 8,589,429 | B1 * | 11/2013 | Thirumalai ......... G06F 17/3064 |
| | | | 707/729 |

(Continued)

OTHER PUBLICATIONS

International Search Report and Written Opinion in PCT/US2015/021128, mailing date: Jun. 15, 2015, 15 pages.

(Continued)

*Primary Examiner* — Kim Nguyen
(74) *Attorney, Agent, or Firm* — Dave Ream; Tom Wong; Micky Minhas

(57) ABSTRACT

A query processing system (QPS) for generating query suggestions to a user by matching the user's input query against a set of query-detection grammars defined by respective rule modules, and with respect to a structured knowledge base. In response to the matching operation, the QPS may generate a set of synthetic query suggestions to the user, representing refinements of the user's input query. The QPS can also present a refinement tool that conveys refinement options to the user. The QPS may also present one or more preview items to the user upon the user's selection of one of the synthetic query suggestions. Each synthetic query suggestion and each preview item is guaranteed to having a matching counterpart information item in the structured knowledge base.

20 Claims, 13 Drawing Sheets

(56) References Cited

U.S. PATENT DOCUMENTS

| | | | | |
|---|---|---|---|---|
| 8,612,414 | B2* | 12/2013 | Lee | G06F 17/30867 707/706 |
| 8,660,849 | B2* | 2/2014 | Gruber | G06F 17/3087 340/988 |
| 8,856,099 | B1* | 10/2014 | Lasko | G06F 17/30864 707/706 |
| 8,909,616 | B2* | 12/2014 | Rosenoff | G06F 17/30864 707/708 |
| 9,218,390 | B2* | 12/2015 | Feng | G06F 17/30401 |
| 2008/0091408 | A1 | 4/2008 | Roulland et al. | |
| 2008/0270366 | A1 | 10/2008 | Frank | |
| 2009/0019002 | A1 | 1/2009 | Boulis | |
| 2009/0106224 | A1 | 4/2009 | Roulland et al. | |
| 2010/0332511 | A1 | 12/2010 | Stockton et al. | |
| 2011/0320470 | A1 | 12/2011 | Williams et al. | |
| 2012/0246133 | A1 | 9/2012 | Hsu et al. | |
| 2012/0265779 | A1 | 10/2012 | Hsu et al. | |
| 2012/0265784 | A1 | 10/2012 | Hsu et al. | |
| 2012/0265787 | A1 | 10/2012 | Hsu et al. | |
| 2012/0284253 | A9 | 11/2012 | Ghosh et al. | |
| 2013/0036137 | A1 | 2/2013 | Ollis et al. | |
| 2013/0110518 | A1 | 5/2013 | Gruber et al. | |
| 2013/0179419 | A1 | 7/2013 | Hsu | |
| 2013/0282702 | A1 | 10/2013 | Zhu et al. | |
| 2014/0075004 | A1* | 3/2014 | Van Dusen | H04L 41/04 709/223 |

OTHER PUBLICATIONS

Dror, et al., "From Query to Question in One Click: Suggesting Synthetic Questions to Searchers," in Proceedings of the 22nd International Conference on World Wide Web, May 2013, 12 pages.

Duan, et al., "Online Spelling Correction for Query Completion," In Proceedings of the 20th International Conference on World Wide Web, 2011, 10 pages.

Hsu, et al., "Space-Efficient Data Structures for Top-k Completion," In Proceedings of the 22nd International Conference on World Wide Web, May 2013, 11 pages.

Zitzelberger, Andrew, "Data Frame Augmentation of Free Form Queries for Constraint Based Document Filtering," available at <<http://citeseerx.ist.psu.edu/viewdoc/download?doi=10.1.1.157.7601&rep=rep1&type=pdf>>, Brigham Young University, 24 pages.

Zhang, et la., "On-the-Fly Constraint Mapping Across Web Query Interfaces," In UIUC Technical Report: UIUCDCS-R-2004-2422, UILU-ENG-2004-1723, Mar. 2004, 6 pages.

Fontoura, et al., "Inverted Index Support for Numeric Search," available at <<http://webcourse.cs.technion.ac.il/236620/Winter2006-2007/hw/WCFiles/paramsearch.pdf>>, In Internet Mathematics, 2006, 27 pages.

Fan, et al., "Suggesting Topic-Based Query Terms as You Type," In Proceedings of 12th International Asia-Pacific Web Conference, 2010, 7 pages.

Espenshade, et al., "Query Interpretation and Suggestion Generation under Various Constraints," U.S. Appl. No. 14/221,526, filed Mar. 21, 2014, 90 pages.

"Facebook Graph Search," available at <<http://en.wikipedia.org/wiki/Facebook_Graph_Search>>, accessed on Mar. 22, 2014, Wikipedia entry, 4 pages.

"Autocomplete for Addresses and Search Terms," available at <<https://developers.google.com/maps/documentation/javascript/places-autocomplete>>, accessed on Mar. 22, 2014, Google Developers, 9 pages.

"Place Autocomplete," available at <<https://developers.google.com/places/documentation/autocomplete>>, accessed on Mar. 22, 2014, Google Developers, 5 pages.

"Second Written Opinion Issued in PCT Application No. PCT/US2015/021128", Mailed Date: Feb. 24, 2016, 07 Pages.

"International Preliminary Report on Patentability Issued in PCT Application No. PCT/US2015/021128", Mailed Date: Jun. 3, 2016, 9 Pages.

* cited by examiner

ILLUSTRATIVE MOVIE TITLE TABLE

| 202 | 204 | 206 | | | |
|---|---|---|---|---|---|
| 1 | 3050 | title=avatar | genre=scifi (208) | director=james cameron | actor=sam worthington | actor=zoe saldana | rating=4.5 |
| 2 | 1176 | title=titanic | genre=drama | director=james cameron | actor=leonardo dicaprio | actor=kate winslet | rating=4 |
| 3 | 1151 | title=skyfall | genre=action | director=sam mendes | actor=ganiel craig | actor=judi dench | rating=4 |
| 4 | 43 | title=les mis | genre=musical | director=tom hooper | actor=hugh jackman | actor=russell crowe | |
| ... | | ... | ... | ... | | | |

FIG. 2

USER INTERFACE MECHANISMS FOR QUERY REFINEMENT

BACKGROUND

A user who interacts with a search system may not know the canonical name of a sought-after item. To address this lack of knowledge, the user often attempts to describe the characteristics of the item. For example, assume that the user is attempting to find information regarding a particular movie title. If the user is not sure of the movie title, he or she may enter the lead actor of the movie, the genre of the movie title, the release date of the movie title, and so on, or any combination thereof, and/or other metadata about the item. The search system may respond to the user's input by generating one or more query suggestions, e.g., beneath an input box in which the user inputs his or her input original query. The search system may generate the suggestions in different ways, such as by consulting information regarding similar queries that were previously submitted by other users, and/or by relying on dictionary resources.

The above strategy yields mixed results. In some cases, the search system fails to identify the desired item, and, furthermore, fails to provide any meaningful assistance to the user in refining his or her search. In other cases, the search system may provide suggestions to the user which correctly identify to the sought-after item. The user may then execute a formal search based one of the suggestions. Yet there is no guarantee that the search will identify meaningful results. For example, a suggestion may identify a desired movie title. But when the user "clicks on" or otherwise selects the suggestion, the search system may indicate that there are no "hits" for the movie title.

The above potential drawbacks in existing search strategies are cited by way of illustration, not limitation; existing search strategies may have further shortcomings.

SUMMARY

A query processing system (QPS) is described herein for assisting a user in refining an input query. In one implementation, the QPS interprets the user's input query using a collection or rule modules, associated with respective query-detection grammars, and by making reference to a structured knowledge base. Based on this analysis, the QPS may then generate and present a set of synthetic query suggestions, each providing a suggestion regarding how the user may refine his or her query. More specifically, each synthetic query suggestion is: (a) predicated on one or more matching query-expression grammars that are derived from previously-submitted queries; (b) formed as an expressive natural language modification of the input query; and (c) is backed by at least one information item contained in the structured knowledge base. By virtue of the last characteristic, upon selecting a synthetic query suggestion, the user can be assured that he or she will receive at least one meaningful search result item associated with the synthetic query suggestion.

According to another illustrative aspect, the QPS can generate and present a query refinement tool to the user, e.g., in the form of a bar or other user interface feature. The query refinement tool presents a plurality of refinement options that pertain to the current state of the user's input query. Upon selecting a refinement option, the QPS can generate another, more refined, set of synthetic query suggestions for the user's consideration.

According to another illustrative aspect, the QPS can omit the presentation of the query refinement tool and/or the synthetic query suggestions on at least one subsequent occasion. The QPS can nevertheless receive a user's entry of an input query based on information learned by the user through at least one previous encounter with the query refinement tool and/or the synthetic query suggestions.

According to another illustrative aspect, the QPS can receive the user's selection of at least one synthetic query suggestion. In response, the QPS can present a set of one or more preview items pertaining to the particular query suggestion. Each preview item identifies an information item which is present in the structured knowledge base.

The above approach can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 shows a portion of one table of a structured knowledge base, for use in conjunction with the QPS of FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A provides an overview of a query processing system (QPS). Section B describes a user interface module, which is a component of the QPS. Section C describes a suggestion generating module, which is another component of the QPS. Section D describes illustrative computing functionality that can be used to implement any aspect of the features described the preceding sections.

Figure 18:
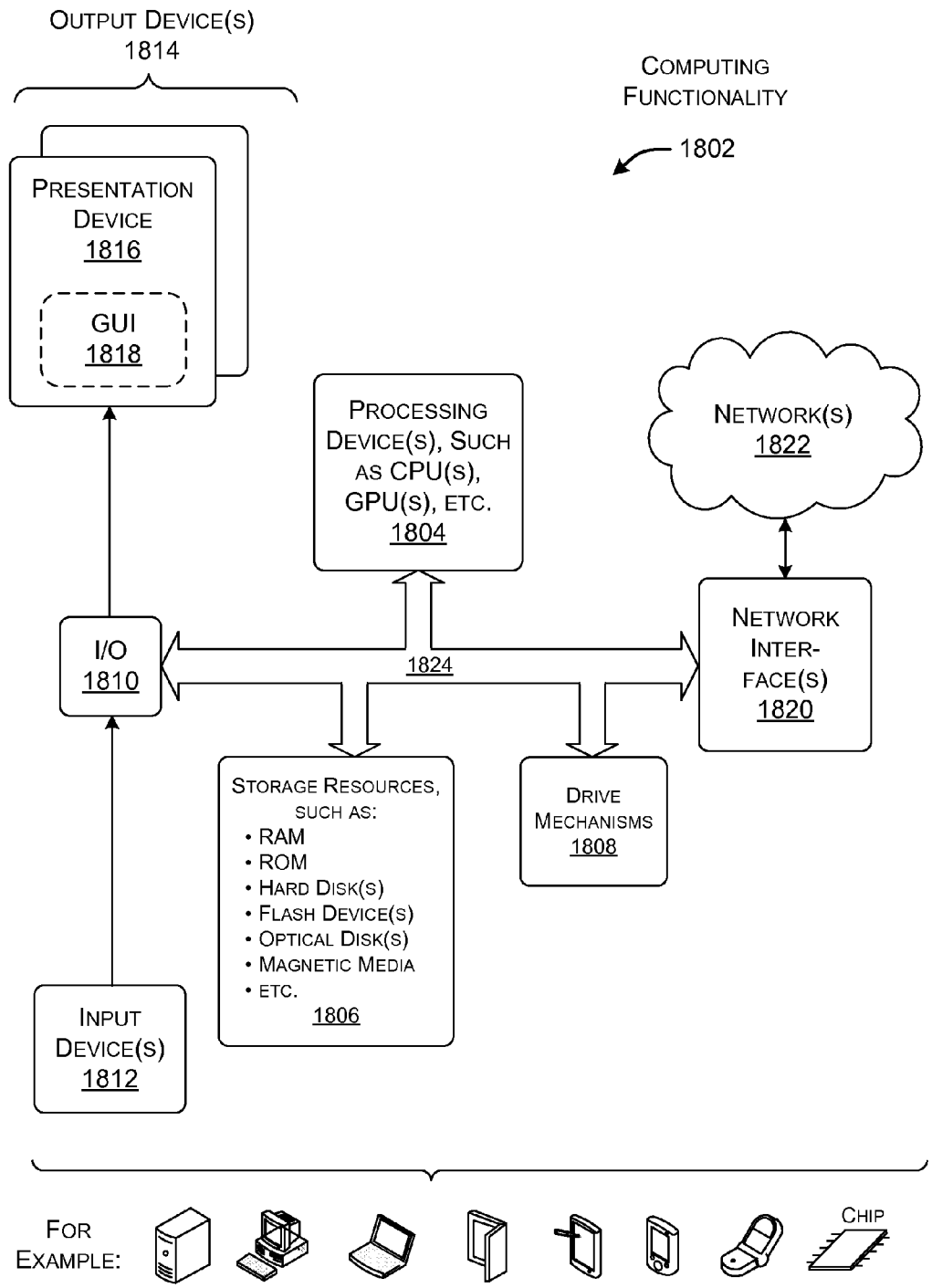
FIG. 18 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 18, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Further, any description of a single entity is not intended to preclude the use of plural such entities; similarity, a description of plural entities is not intended to preclude the use of a single entity. Finally, the terms "exemplary" or "illustrative" refer to one implementation among potentially many implementations.

A. Overview of the Query Processing System (QPS)

Figure 1:
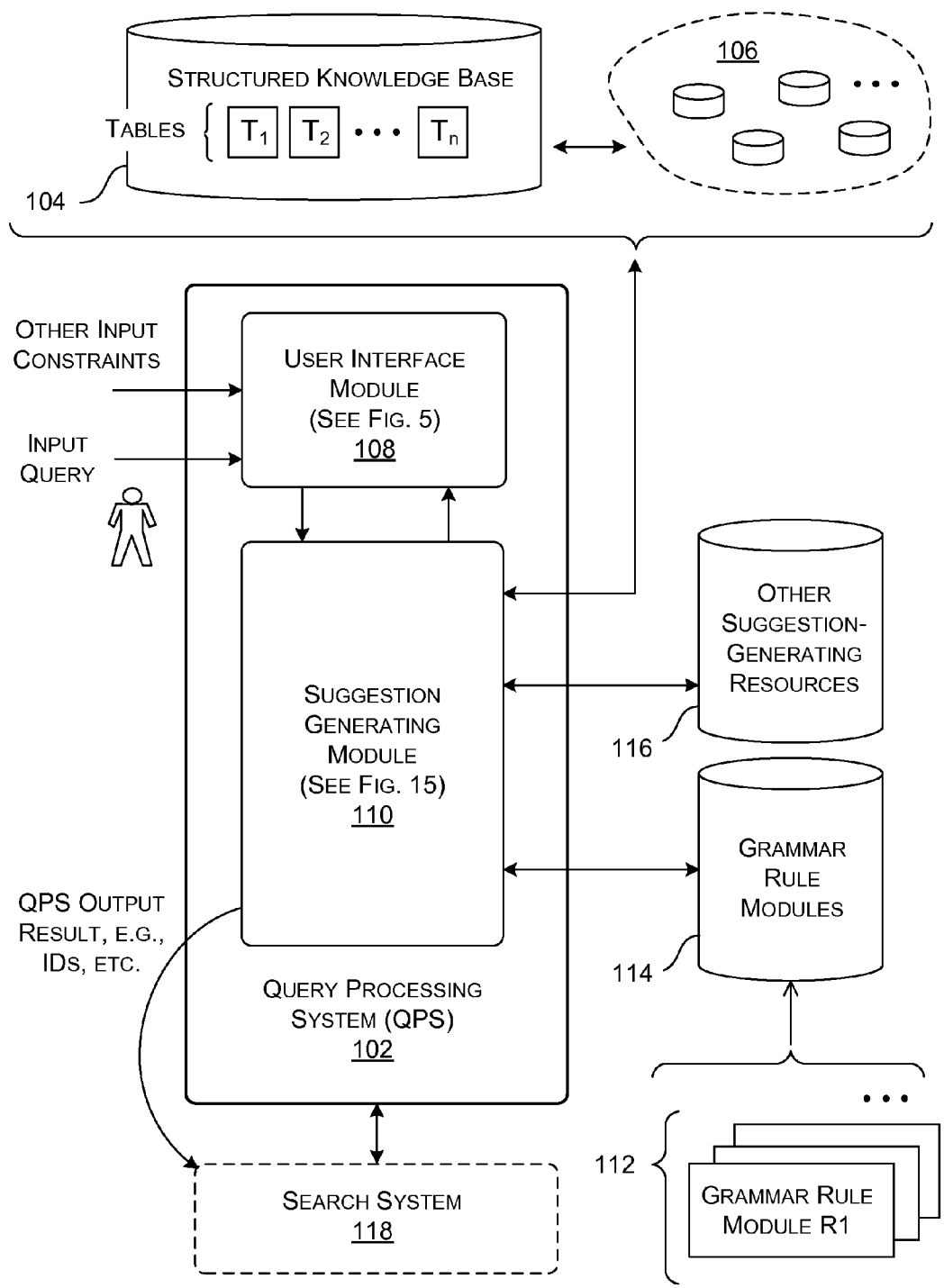
FIG. 1 shows an overview of a query processing system (QPS) for processing a user's input query.

FIG. 1 shows a query processing system (QPS) 102 for processing a user's input query with reference to a structured knowledge base stored, for example, in at least a data store 104. For example, the QPS 102 may accept an input query from a user, corresponding to a complete query or a yet-to-be-completed query. In response, the QPS 102 can provide zero, one, or more query suggestions to the user. Each query suggestion provides a recommendation as to how the user may complete his or her query. In addition, the QPS 102 may provide one or more preview items. Each preview items corresponds to an entity in the structured knowledge base.

As to terminology, an "entity" may correspond to any identifiable focus of interest. In the most prominent examples in this description, different entities correspond to products produced by companies, media items (e.g., movies, musical releases, books, etc.), and so on. But an entity may also correspond to any organization (e.g., a company), a person, a group of people, an animal, a place, a region, a building, a naturally occurring article, and so on. Each entity has one or more characteristics, referred to as attributes. For example, a particular car model may be characterized by specifying its engine size, horse power rating, fuel rating, color, and so on, all of which constitute attributes of that model. An attribute may be assigned an attribute value. For example, "automatic" constitutes a value for the attribute "transmission." The term "entity item" refers to any entry in a data store which describes an entity. The term "attribute value item" refers to an entry in a data store which describes an attribute value. The more general term "information item" refers to any piece of information expressed in the structured knowledge base, e.g., corresponding to an entity item, an attribute item, an attribute value item, etc.

Overall, the structured knowledge base provides information regarding a plurality of entities in a structured form, e.g., using a particular data structure, such as a graph data structure. For example, in the example of FIG. 2, the structured knowledge base includes a series of rows corresponding to different respective movies. In other words, each row constitutes an entity item, which represents a particular movie. In this illustrative case, the first column 202 may provide indices associated with the different entity items. A second column 204 may provide entity scores associated with the entity items. For example, each entity score may reflect the popularity of an associated movie title. Popularity can be assessed in any manner, e.g., based on any of: the sales activity associated with the movie; the number of times that users have viewed the movie; the number of times that users have searched for the movie title using a commercial search system, and so on. A series of remaining columns 206 are devoted to different attributes of the movies. Each entry in this section corresponds to an attribute-value pair, including an attribute item and an associated attribute value item. For example, the entry 208 indicates that the genre of the movie having the title "Avatar" is "science fiction." The information shown in FIG. 2 is presented by way of example, not limitation; other structured knowledge bases may provide different content, and/or can use other data structures to organize the content.

Returning to FIG. 1, the structured knowledge base may include one or more tables, devoted to different respective topics. For example, the structured knowledge base can provided a first table devoted to movies (as shown in FIG. 2), a second table devoted to musical works, a second title devoted to books, and so on. No limitation is placed on the types of content that may be expressed by the structured knowledge base.

More generally, as the term is used herein, a structured knowledge base refers to any repository or repositories of information that: (a) specifies a plurality of information items; and (b) uses some mechanism to represent the relationships among the information items. In one example, the structured knowledge base can represent the information items and relationships in a table form, as shown in FIG. 2. In another example, the structured knowledge base can represent the information items as nodes, and the relationships among the nodes as links. Still other data structures may be used to represent the information items and their relationships. The structured knowledge base may be broadly considered "structured" insofar as it conveys some relationship among its information items.

Further, to simplify the description, many of the following examples assume that the structured knowledge base is expressed by information provided in one or more data stores (e.g., the data store 104), as administered by a single entity. In other cases, the structured knowledge base can correspond to a more inclusive universe 106 of information, provided by plural data stores. More specifically, the data stores may be associated with respective computer systems, and may be distributed among any number of sites. Further, the data stores may be administered by any number of entities, such as separate companies, etc. For example, the extended universe 106 of information may encompass social network data maintained by one or more social network systems. The systems may communicate with each other using any type of computer network, such as a wide area network (e.g., the Internet).

In the above example, each separate component of the structured knowledge is associated with a collection of local information items. For example, a movies database can store information regarding movies and the relationships among the movies. A social network database can store information regarding its users and the relationships among the users, and so on. Each component of the structured knowledge base can optionally also store the relationships between its local information items and at least some of the information items maintained by at least one external component of the structured knowledge base. For example, a movie entry in a movies database can provide a link to a corresponding entry in a social network database. In its entirety, therefore, the structured knowledge base may represent a large knowledge graph that is potentially hosted by two or more separate computer systems.

As a consequence of the above implementation, the QPS 102 can successfully process a user's query that makes reference to information maintained in two or more components of the structured knowledge base. For example, assume that the user inputs the query, "Jim Carey movies my friends liked that grossed over 200 m." To answer that query, the QPS 102 can pull information from a movies database, e.g., to identify a list of movies produced by the actor Jim Carey which grossed over 200 million dollars. The QPS 102 can then access a separate social network database to discover a subset of movies that the user's friends liked. The QPS 102 can then conjunctively combine the first list of movies with the second list of movies, to produce an answer to the user's query.

In one implementation, the QPS 102 can interact with external databases, maintained by external computer systems, using APIs provided by those external systems. For example, in the above example, the QPS 102 can submit a request to a social network system, asking that system to return a list of movies that are "liked" by the friends of the person who has submitted the query.

Likewise, the term "query" or "input query," as used herein has broad connotation. In many of the following examples, it will be assumed that a query corresponds to an alphanumeric string that is input by the user through any input mechanism (e.g., a keypad mechanism, a touch-sensitive screen input mechanism, a voice recognition mechanism, and so on). In addition, or alternatively, the query can include other data provided by other source(s), such as position data provided by any type of position-determination mechanism (such as a GPS mechanism), movement data provided by an accelerometer, gyroscope, etc., user history data maintained by any data store, and so on.

The QPS 102 may include, or be conceptualized as including, two principal modules: a user interface module 108 and a suggestion generating module 110. The user interface module 108 interacts with the user. For example, the user interface module 108 can receive an input query from the user, as well as any subsequent modifications to that input query. The user interface module 108 can also present various aids that assist the user in refining his or her query; the user interface module 108 can also handle the user's interaction with those aids. Section B provides more detailed information regarding one implementation of the user interface module 108.

The suggestion generating module 110 generates one or more query suggestions based on the user's input query, and/or any subsequent modification of that input query. More specifically, based on an input query, the suggestion generating module 110 can generate a set of zero, one, or more synthetic query suggestions. In addition, or alternatively, the suggestion generating module 110 can generate a set of zero, one, or more organic query suggestions. A synthetic query suggestion refers to a suggestion that is generated based on the application of rule modules, and in response to the interrogation of a structured knowledge base. An organic query suggestion is a suggestion generated in any other manner. Different terms could be used to convey the difference between these two types of queries, as by referring to synthetic query suggestions as grammar-based query suggestions, and the organic query suggestions as non-grammar-based query suggestions, and so on.

Section C provides more detailed information regarding one implementation of the suggestion generating module 110. To provide a preview of the information imparted in that section, the suggestion generating module 110 may generate a set of synthetic query suggestions by matching an input query against a set of query-detection grammars, defined by respective rule modules 112. A data store 114 may store the set of rule modules 112. As will be described in Section C, each rule module identifies a pattern associated with a particular query-detection grammar, for use in interpreting the input query. Further, each rule module may identify a manner of interrogating the structured knowledge base, to determine whether there is data to respond to the input query. Further, each rule module may specify, or may be otherwise associated with, at least one query-expression grammar that can be used to formulate one or more synthetic query suggestions.

More specifically, the suggestion generating module 110 may analyze an input query by first identifying one or more paths through a query-detection space associated with a master query-detection grammar; that master grammar, in turn, is defined by the individual query-detection grammars specified by the rule modules. Each such path represents a candidate interpretation of the input query, and may reflect the query-detection patterns specified by one or more rule modules. Further, in the process of determining the viability of a path, the suggestion generating module 110 determines whether it is backed by one or more counterpart information items in the structured knowledge base. A path is determined to be nonviable if it refers to information items that are not contained in the structured knowledge base. For example, assume that an interpretation is predicated on the assumption that the user is looking for friends that work in the city of London. The suggestion generating module 110 may identify rule modules which successfully parse the user's query in the manner indicated, but it may ultimately discard the interpretation if the structured knowledge base reveals that the user, in fact, has no friends who work in the city of London.

In some examples, as set forth above, the structured knowledge base may represent a collection of component knowledge bases, maintained at one or more sites. In this situation, the suggestion generating module 110 uses a collection of query-detection grammars that can successfully interpret the user's query across the various component knowledge bases. For example, the suggestion generating module 110 can use a first subset of query-detection grammars for parsing a part of the user's query that is directed to a social network database, and a second subset of query-detection grammars for parsing a part of the user's query that is directed to a movies database, and so on. The suggestion generating module 110 can determine whether a query that implicates two or more separate knowledge bases is viable by separately checking those databases (e.g., to determine whether those databases store corresponding entries).

After identifying a viable interpretation, the suggestion generating module 110 can identify one or more synthetic query suggestions which leverage the interpretation. In one approach, the suggestion generating module 110 can identify one or more query-expression grammars which are associated with an identified interpretation of the input query. In one case, a query-expression grammar may be formed as a template that specifies a natural language expression, having one or more slots for receiving information items. The suggestion generating module 110 can fill in the slots with appropriate information items, pulled from the structured knowledge base, to produce one or more structured query suggestions. The information items may correspond to entity items, attribute items, attribute value items, etc.

In one implementation, the query-expression grammars are derived from actual queries that users have submitted on previous occasions. Consider, for example, a query-expression grammar that conveys information regarding movie actors. To generate such a grammar, an offline process can identify common phrases that users have used to specify movie actors, selected from a corpus of previous queries. The offline process can then formulate a query-expression grammar which describes at least one such common phrase, which, as stated above, may constitute a template having one or more slots. The query-expression grammar has a natural and grammatical form because the queries from which it is derived are largely expressed in natural and grammatical form.

As a result of the above characteristic, the suggestion generating module 110 can formulate each synthetic query suggestion so that it corresponds to an expressive natural language extension of the user's input query. Less formally stated, the suggestion generating module 110 forms each synthetic query suggestion such that it appears natural and grammatical to the user, rather than being a mere mechanical assemblage of keywords.

To render the explanation more concrete, consider the following simplified scenario, which will serve as a running example in the explanation. Assume that the user is attempting to find a movie that was released in 2013 that stars the actor Robert Downey Jr. But assume that the user cannot quite remember the name of the movie. The user may start by inputting the partial query, "action movies." That partial query specifies a single constraint, in the domain of movies, associated with the attribute-value pair "genre=action."

In response to the partial query, the suggestion generating module 110 can compare the query against each of the query-detection grammars, specified by the rule modules in the data store 114. Assume that a first rule module is based on a grammatical pattern in which a user provides some reference to a movie (such as by typing the word "movie" or "movies"), followed by some reference to an actor that stars in the movie. For example, a user may input "movies starring Chevy Chase." Assume that a second rule module is based on a grammatical pattern in which a user provides some reference to a movie, followed by some reference to the release date of the movie. For example, a user may input "movies in 2013." Assume that a third module is based on a grammatical pattern in which a user provides some reference to a movie, followed by some reference to the movie's director. For example, the user may input "by James Cameron." Hence, in this example, based on the user's specification of "movies" in the input query, the suggestion generating module 110 may determine that there are at least three interpretative paths through the master query-detection grammar that are applicable to the input query, predicated on the application of three alternative query-detection grammars.

To validate each interpretation, the suggestion generating module 110 can apply each matching rule module by interrogating the structured knowledge base to determine whether it is supported by any information items contained therein. For example, consider the first rule module, which pertains to the specification of actor names. The suggestion generating module 110 can determine whether the structured knowledge base includes information pertaining to actor names. Assume that it does. The suggestion generating module 110 may then make the further determination that the structured knowledge base contains actor names who have appeared in action movies, as the user's query contains the single constraint "genre=movies." Assume that it does. The suggestion generating module 110 can then apply at least one query-expression grammar to generate one or more synthetic query suggestions which contain the names of actors specified in the structured knowledge base, who have also appeared in action movies.

As a result of the above-described manner of operation, each synthetic query suggestion will be backed by at least one information item that appears in the structured knowledge base, and which satisfies all of the constraints in the input query. For example, hypothetically assume that the actress Cate Blanchet has never appeared in an action movie.

The suggestion generating module 110 will not present a synthetic query suggestion that presents the name of Cate Blanchet. In other cases, a user may input a query topic that is not even covered by the structured knowledge base. For example, the user may input a query directed to an automobile part. If the structured knowledge base does not have a table for that topic, the suggestion generating module 110 will not generate any synthetic query suggestions for that query.

In the above example, each synthetic query suggestion has a structure that reflects one or more query-expression grammars on which it is predicated. For example, assume that one rule module is associated with a query-expression grammar having the phrasing "{movie or movies} staring {actor}." The suggestion generating module 110 can generate a synthetic query suggestion by filling in the name of an actor that appears in the structured knowledge base, and which meets all of the other terms of the user's input query. For example, the suggestion generating module 110 can produce the phrase "starring Tom Cruise" and then append that phrase to the user's existing query, to thereby produce, in its entirety, "action movies starring Tom Cruise."

The suggestion generating module 110 can generate an organic query suggestion using any resources provided in a data store 116, based on any technique. For example, one type of resource may store information regarding queries submitted by a large group of users over a period of time. The suggestion generating module 110 can compare the input query with popular queries to identify a set of similar previous queries, if any. Similarity can be assessed based on any metric(s), such as any edit score or scores. Another type of resource may correspond to one or more dictionaries. The suggestion generating module 110 can compare the input query with dictionary(ies) to identify a set of similar dictionary entries, if any. Again, similarity can be gauged on any type of metrics. In one implementation, the suggestion generating module 110 may not perform a check to determine whether each organic query suggestion is backed by at least one corresponding information item in the structured knowledge base.

At any stage, the user may perform a formal search, e.g., to retrieve relevant information from the Web or other repositories of information. For example, the user may perform a search based on the input query as it exists at a current time. Or the user may perform a search based on a selected query suggestion, e.g., by clicking on that query suggestion. The QPS 102 may then submit the query to any search system 118 or retrieval system, such as the Binge search system provided by Microsoft® Corporation of Redmond, Wash.

Consider the particular example in which the search system 118 performs a search based on a synthetic query suggestion. The synthetic query suggestion is formulated to accurately and concisely express the user's intent in a natural manner. These characteristics of the input query may improve the quality of the search results returned by the search system 118.

Moreover, in one implementation, the QPS 102 can also pass supplemental information to the search system 118, which reflects the outcome of its processing. For example, the QPS 102 can pass information regarding the IDs of the entity items identified by the QPS 102, and/or the parsing results generated by the QPS 102, and so on. The search system 118 can then use the supplemental information to further improve the accuracy and usefulness of its search results. The search system 118 can also leverage the supplemental information to provide, at any juncture, a carousel-type display (or the like) of matching entity items.

The user interface module 108 will present the synthetic and/or organic query suggestions in the illustrative manner specified in Section B. In addition, the user interface module 108 can present, at certain junctures, a refinement tool. The refinement tool presents one or more refinement options to the user. The user may select one of these refinement options, e.g., by clicking on it, touching it on a touch-sensitive screen, etc. In response, the suggestion generating module 110 can generate a new set of synthetic query suggestions. The new set of synthetic query suggestions may be more refined compared to a preceding set of synthetic query suggestions (if there was such a previous set). The new set of synthetic query suggestions may further pertain to the refinement option selected by the user.

To render the explanation more concrete, again consider the scenario in which the user has input the query "action movies," with the ultimate attempt to identify an action movie starring Robert Downey Jr. that was released in the year 2013. Again assume that the suggestion generating module 110 identifies at least three rule modules that can be used to interpret the user's query. Each rule module leverages a particular attribute of the movies table shown in FIG. 2. The user interface module 108 can then select a plurality of refinement options that correspond to the identified attribute items. For example, the user interface module 108 can present refinement options corresponding to year of release, actor, and director, etc. In another case, the suggestion generating module 110 can identify the top-matching entity items associated with the input query, which are associated with one or more tables in the structured knowledge base. The suggestion generating module 110 can select attribute value items from these tables for use in populating the refinement tool, or a subset of these attribute value items having the highest scores.

Assume that the user selects an actor refinement option. The suggestion generating module 110 can respond by selecting a query-expression grammar that is associated with the selected attribute (and other constraints expressed by the input query), and then presenting a series of synthetic query suggestions generated by the selected query-expression grammar. For example, the query-expression grammar may have the form, "staring {actor}," and may be associated with an identified actor-related rule module.

The refinement tool and the synthetic query suggestions have at least two benefits. First, in the context of the user's current engagement with the QPS 102, these mechanisms provide meaningful assistance to the user in refining his or her query. The assistance is meaningful in that it contextually reflects both the current state of the user's query and the information that is provided in the structured knowledge base. Stated in the negative, these mechanisms do not present a generic set of refinement options that are the same, regardless the current state of the user's query, and/or regardless of the existence or non-existence of corresponding attributes specified in the structured knowledge base.

As a second potential benefit, the refinement tool and the synthetic query suggestions train the user regarding a preferred manner of inputting his or her queries. The user may then develop the habit of entering his or her queries in that preferred manner. The user may then be successful in duplicating the preferred manner of entry even in the absence of the refinement tool and/or the synthetic query suggestions. The user may encounter such a situation when he uses a user device which does not accommodate the presentation of the refinement tool and/or the synthetic query suggestions, such as any device having a small screen size, such as a smartphone or the like (although there is also nothing preventing a smartphone or the like from presenting these mechanisms). In another case, an experienced user may expressly de-activate the suggestion generating module 110, to provide a more streamlined and simplified interface, and/or to reduce the utilization of computing resources. If that user encounters difficulty in finding a desired item, he or she may turn the suggestion generating module 110 back on. Further note that the synthetic query suggestions are expressed using grammatical and natural phrasings; this characteristic facilitates the ability of the users to remember the phrasings used by the synthetic query suggestions.

Figure 3:
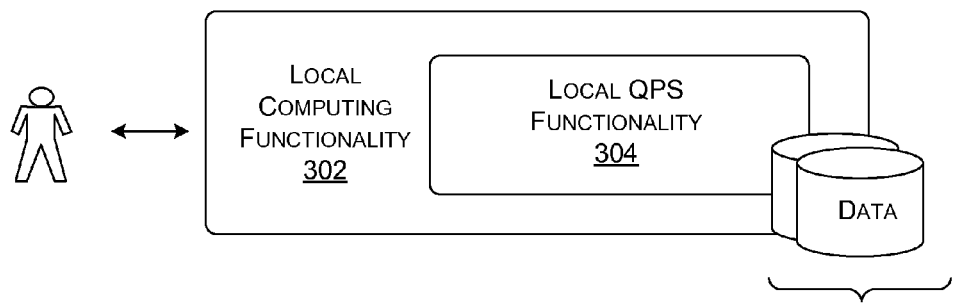
FIG. 3 shows computing functionality for implementing the QPS, according to a first implementation.

Advancing to FIG. 3, this figure shows a local stand-alone implementation of the QPS 102 of FIG. 1. In this case, local computing functionality 302 provides local QPS functionality 304 which, together with one or more local data stores 306, implements all aspects of the QPS 102 of FIG. 1. The local computing functionality 302 may correspond to any computing device, such as a workstation computing device, a set-top box, a game console, a laptop computing device, a tablet-type computing device, a smartphone or other kind of wireless telephone, a personal digital assist device, a music-playing device, a book-reader device, a wearable computing device, and so on.

Figure 4:
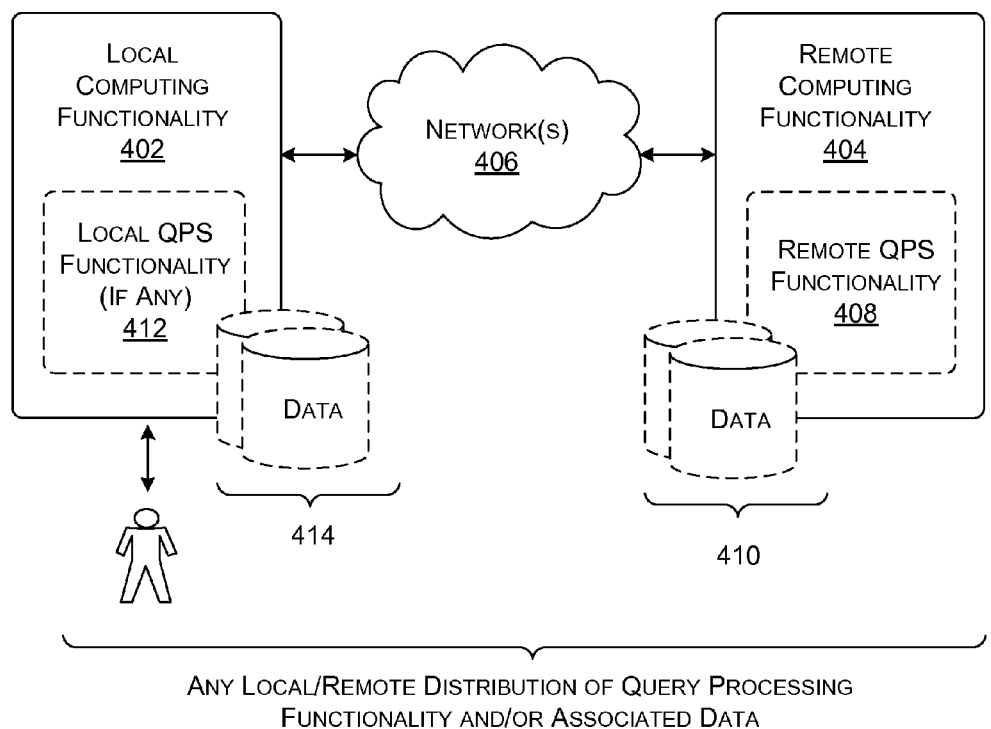
FIG. 4 shows computing functionality for implementing the QPS, according to a second implementation.

FIG. 4 shows another implementation of the QPS 102 of FIG. 1. In this scenario, local computing functionality 402 is coupled to remote computing functionality 404 via one or more networks 406. In one case, the remote computing functionality 404 includes remote QPS functionality 408 which implements all aspects of the QPS 102, in conjunction with one or more remote data stores 410. A user may interact with the remote computing functionality 404 using the local computing functionality 402 via the network(s) 406. In another case, the functions performed by the QPS 102 are distributed between the remote computing functionality 404 and local computing functionality 412. The local QPS functionality 412 runs on the local computing functionality 402, in conjunction with one or more local data stores 414.

In one technology-specific implementation, the local computing functionality 402 may provide a browser program. The user interacts with the functionality of the QPS 102 via the browser program, e.g., based on markup code and JavaScript code which are received from the remote computing functionality 404. In another case, the local computing functionality 402 stores a local application. The local application interfaces with the remote computing functionality 404 via application programming interfaces (APIs) or the like. Still other technology-specific implementations are possible.

The local computing functionality 402 may correspond to any computing device described above with reference to FIG. 4. The remote computing functionality 404 may correspond to one or more servers and associated data stores, provided at a single site or distributed among two or more sites. The network(s) 406 may correspond to a local area network, a wide area network (e.g., the Internet), point-to-point communication links, etc. or any combination thereof.

B. The User Interface Module

Figure 5:
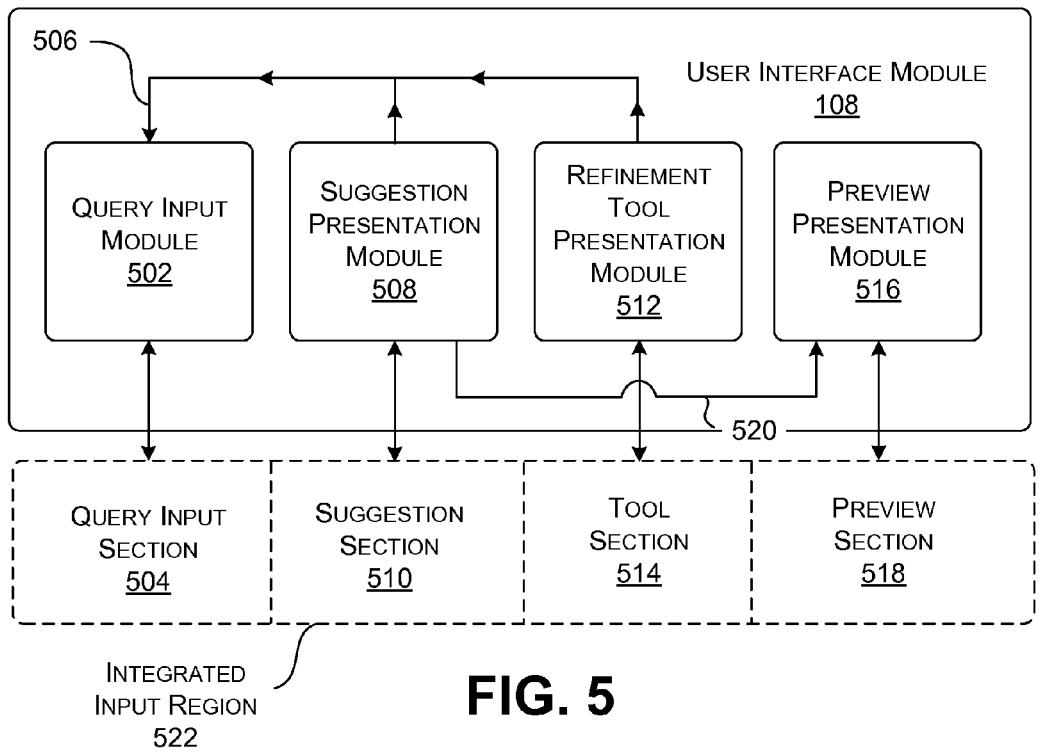
FIG. 5 shows one implementation of a user interface module, which is a component of the QPS.

FIG. 5 provides a logical representation of the user interface module 108, introduced in Section A. The user interface module 108 can include a query input module 502 for receiving an input query via a query input section 504 of a user interface presentation. The user may engage the query input module 502 in any manner, e.g., by typing alphanumeric characters into the query input section 504, or by selecting characters, phonemes, words, etc. in any other manner. FIG. 5 shows, as per path 506, that the other modules may also automatically modify the input query that appears in the query input section 504.

A suggestion presentation module 508 generates and presents query suggestions in a suggestion section 510 of the user interface presentation. The query suggestions, at any given time, can correspond to zero, one, or more synthetic query suggestions, and/or zero, one, or more organic query suggestions.

A refinement tool presentation module 512 presents a refinement tool via a tool section 514 of the user interface presentation. As set forth in Section A, the refinement tool presents a plurality of refinement options to the user, for use by the user in further refining the input query in the query input section 504.

A preview presentation module 516 presents one or more preview items in a preview section 518 of the user interface presentation. FIG. 5 indicates, as per path 520, that the preview presentation module 516 may interact with at least the suggestion presentation module 508; for example, the preview presentation module 516 can receive a selection of a synthetic query suggestion that appears in the suggestion section 510, and present one or more preview items corresponding to this particular synthetic query suggestion.

In one implementation, the user interface module 108 presents the sections (504, 510, 514, 518) described above in visual form, e.g., via a graphical user interface presentation provided on one or more display devices. More specifically, in one implementation, the user interface module 108 can present the above sections (504, 510, 514, 518) as part of an integrated input region 522. This organization of features gives the visual impression that the various sections (504, 510, 514, 518) form part of a collective service devoted to assisting the user in formulated his or her query. In other implementations, the various sections (504, 510, 514, 518) may be displayed in two or more parts of the user interface presentation. In addition, or alternatively, one or more of the sections (504, 510, 514, 518) can use non-visual forms of information delivery, e.g., by using voice recognition technology to receive input from the user and/or by presenting output information via synthesized speech.

FIGS. 6-10 show one illustrative technique for implementing the various sections (504, 510, 514, 518) introduced in FIG. 5. All aspects of these presentations are to be understood in the spirit of illustration, rather than limitation. Such aspects include the selection of user interface features, the arrangement of the features, the behavior of the features, the appearance of the features, and so on.

Figure 6:
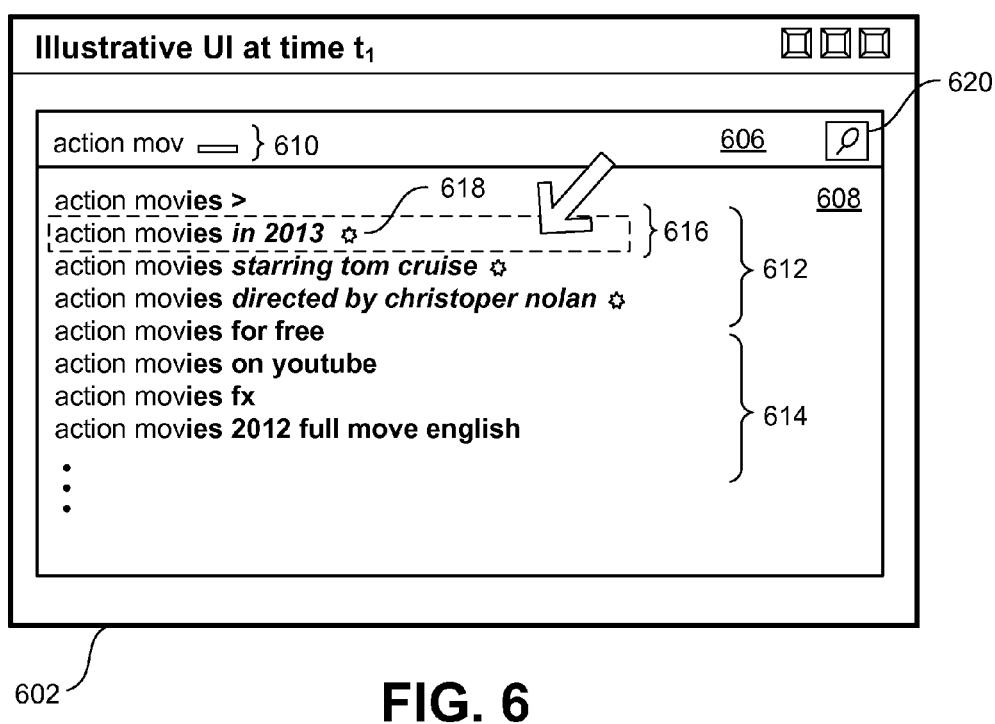
FIGS. 6-10 show illustrative user interface presentations that may be generated by the user interface module of FIG. 5.

Starting with FIG. 6, this figure shows a user interface presentation 602 having an integrated display region 604. The integrated display region 604, in turn, includes a query input section 606 and a suggestion section 608. To repeat, the query input section 606 provides a region through which the user may input a query, using any input technique. The suggestion section 608 provides a region through which the suggestion presentation module 508 may present zero, one, or more synthetic query suggestions and/or zero, one, or more organic query suggestions. In the present example, the suggestion section 608 corresponds to a region immediately below the query input section 606, thus giving the user the impression that these two sections (606, 608) form part of the integrated display region 604. In other implementations, the two sections (606, 608) can have any positional relationship to each other.

In the illustrated example, again consider the example introduced in Section A. Here, the user intends to locate a particular movie that stars Robert Downey Jr., released in the year 2013. But the user does not remember the title of the movie. At the particular juncture represented by the user interface presentation 602, the user has finished typing the input query 610 which reads, "action mov," e.g., by not yet completing the word "movies." Hence, this input query 610 is an example of a yet-to-be-completed query.

In response to the user's input query, the suggestion generating module 110 generates a set of synthetic query suggestions 612 and a set of organic query suggestions 614. The synthetic query suggestions 612 reflect query-expression grammars associated with one or more rule modules, which have been determined, by the suggestion generating module 110, to match the input query 610. For example, the first synthetic query suggestion 616 is derived based on a query-expression grammar that leverages release date information, and which appends the phrase "in 2013" to the user's input query 610, after completing the word "movies." The suggestion generating module 110 can generate the organic synthetic query suggestions 614 in any manner, e.g., by identifying previous popular queries which are similar to the user's present query 610.

In one implementation, the user interface module 108 presents information that distinguishes between the set of synthetic query suggestions 612 and the set of organic query suggestions 614. For example, FIG. 6 shows that each synthetic query suggestion may have an identifying tag, as in illustrative tag 618, which identifies it as a synthetic query suggestion. A query suggestion without such a tag is an organic query section. This display technique is merely illustrative; in other implementations, the user interface module 108 can distinguish the synthetic query suggestions 612 from the organic query suggestions 614 based on any visual attribute or attributes (such as color, font type, font size, etc.), and/or by displaying these two query types in different display regions. In yet other cases, the user interface module 612 mixes the synthetic query suggestions 612 in with the organic query suggestions 614 without distinguishing between the two groups.

At this juncture, assume that the user types "2013" into the query input section 606, as guided by the synthetic query suggestion 616. Alternatively, the user can perform a formal search based on the input query 610 as it presently exists, e.g., by clicking on a search icon 620.

Figure 7:
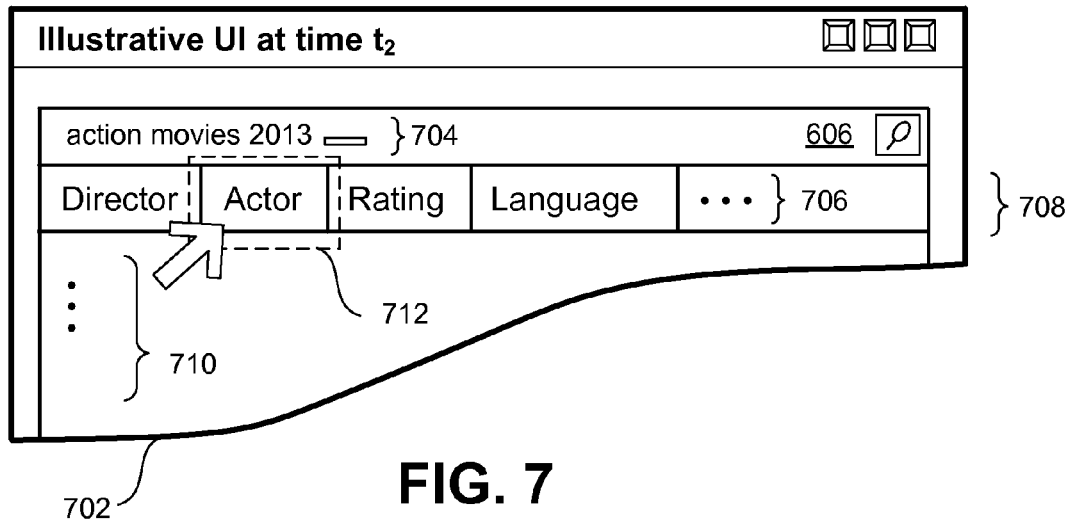
Figure 8:
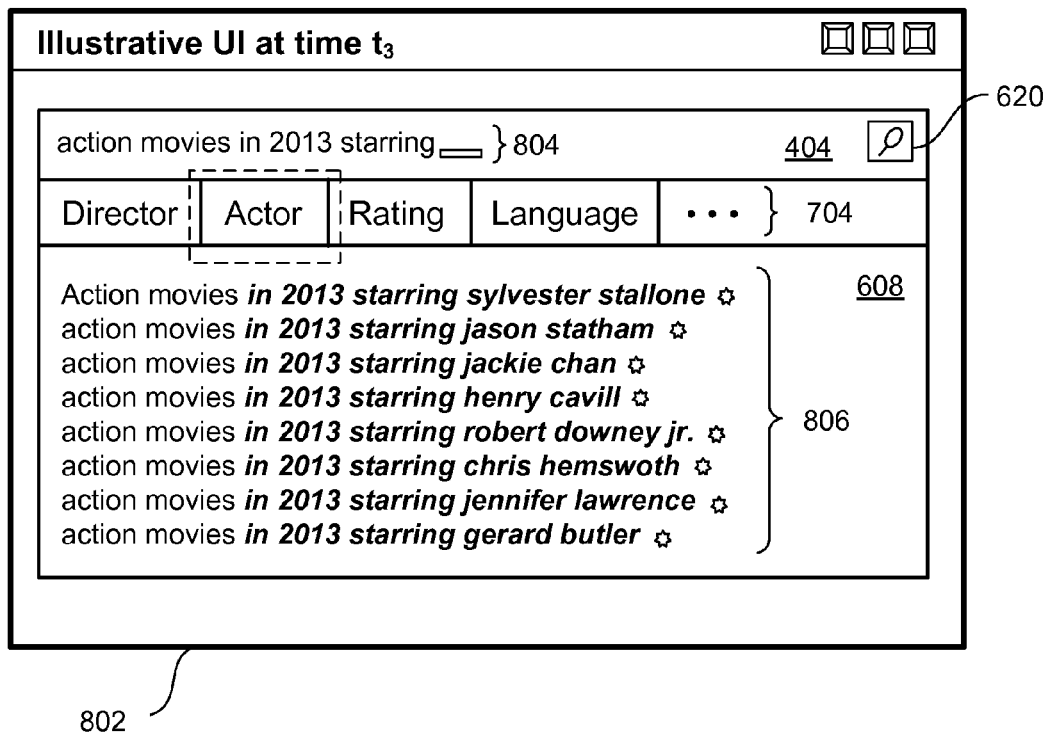

FIG. 7 shows a user interface presentation 702 that shows the outcome of the above-described input action by the user. That is, as shown there, the user has added the text "2013" to the end of the previous query, to produce an updated query 704.

At this juncture, assume that the user interface module 108 presents a refinement tool 706 in a tool section 708. In this representative example, the refinement tool corresponds to a bar that identifies a plurality of refinement options, including "Director," "Actor," "Rating," "Language," and so on. The user interface module 108 selects these options based on the results provided by the suggestion generating module 110. The suggestion generating module 110, in turn, generates the refinement options based on a determination of rule modules and/or entity items which match the user's input query, at the present time, or based on some other technique. For example, the suggestion generating module 110 can determine that matching rule modules leverage the director, actor, rating, etc. attributes of the movies table shown in FIG. 2. Hence, the suggestion generating module 110 can generate refinement options corresponding to these attributes. Or the suggestion generating module 110 can generally note that the input query pertains to the movies-related table, and then extract attributes from that table.

Although not shown, the user interface module 108 can also present a set of query suggestions 710 based on the input query 704, in its present form.

Assume, at this juncture, that the user selects an actor refinement option 712 in the refinement tool 706. In response, the user interface module 108 provides the user interface presentation 802 shown in FIG. 8. More specifically, in response to the user's selection, the user interface module 108 appends the word "starring" to the user's input query, to provide the updated input query 804. The suggestion generating module 110 also generates a new set of synthetic query suggestions 806 based on the user's selection; the user interface module 108 then presents that set of synthetic query suggestions 806 in the suggestion section 608. Each synthetic query suggestion leverages a query-expression grammar associated with an identified rule module (or modules), associated with the phrase "starring {actor}." The suggestion generating module 110 generates a plurality of such suggestions by extracting names from the structured knowledge base which satisfy the user's query, and inserting those names in the identified template. Stated in the negative, the suggestion generating module 110 will not generate any synthetic query suggestions that identify actor names that do not meet the query. For example, as stated, if the actress Cate Blanchet has not produced an action movie in the year 2013, then a synthetic query suggestion for this actress will not appear in the suggestion section 608.

In one implementation, the suggestion section 608 at this juncture may exclude organic query suggestions. However, in another case, the suggestion generating module 110 can also generate one or more organic query suggestions, and the user interface module 108 can present those suggestions in the suggestion section 608 at this juncture.

Figure 9:
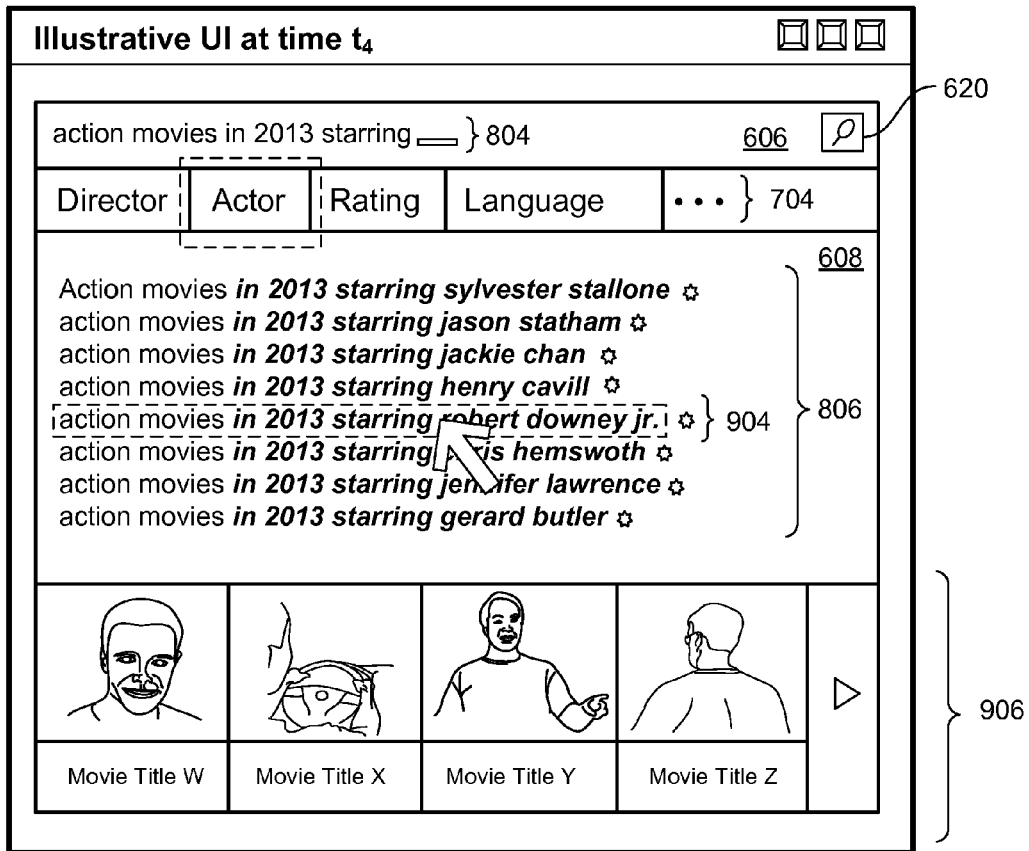

Advancing now to a user interface presentation 902 shown in FIG. 9, assume that the user selects one of the synthetic query suggestions, such as the synthetic query suggestion 904 that reads, "action movies 2103 starring robert downey jr.," as this is ultimately the information being sought by the user. The user may make such a selection in any manner. For example, the user may make a hover-type selection by moving a mouse-controlled pointer over the query suggestion 904, or by clicking on the query suggestion 904 using the mouse device, or by touching the query suggestion 904 on a touch-sensitive display screen, or by speaking the query suggestion 904, and so on.

In response to the above action, the user interface module 108 can present one or more preview items in a preview section 906 of the user interface presentation 902. Each preview item corresponds to an information item, identified in the structured knowledge base, which matches the synthetic query suggestion 904. For example, each preview item may correspond to a movie title that features the actor Robert Downey Jr., released in the year 2013, in the action genre. In one implementation, the user interface module 108 may identify the preview items by making an inquiry into the structured knowledge base, without otherwise performing a formal search based on the selected synthetic query suggestion 904.

Each preview item can describe the matching information item in any manner. For example, each preview item can include image information which pictorially represents the matching information item. In addition, or alternatively, each preview item can include textual information which describes the matching information item, and so on.

As this juncture, now assume that the user wishes to retrieve further information regarding one of the preview items, or obtain additional information regarding the selected synthetic query suggestion 904. To perform this task, the user may choose one of the preview items, such as by clicking on it in the preview section 906. Or the user may modify the input query 804 in the query input section 606 so that it reflects the synthetic query suggestion 904 (e.g., clicking on the synthetic uqery suggesetion 904), and then activate the search icon 620. Still other techniques can be used to retrieve additional information regarding a particular preview item or input query. As described in Section A, the suggestion generating module 110 can also pass any supplemental information to the search system 118, for use by the search system 118 in generating relevant search results. Such information may include, for example, the IDs of matching entity items.

Figure 10:
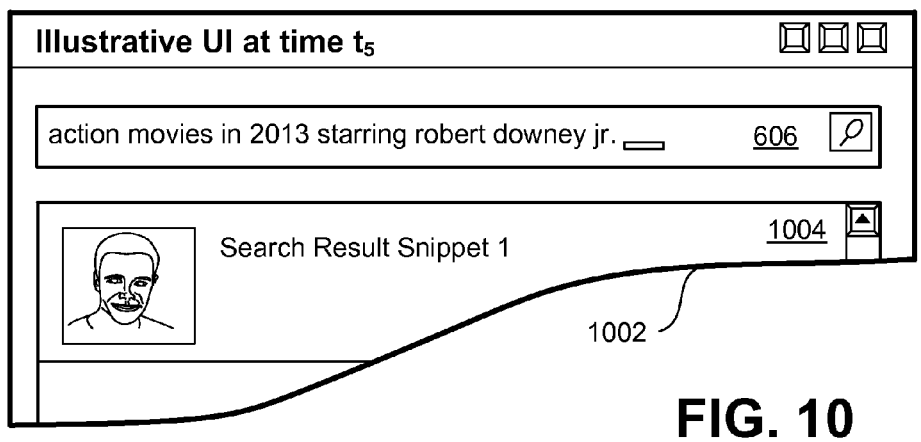

In FIG. 10, the search system 118 (of FIG. 1) may present a user interface presentation 1002 that provides additional information regarding the selected preview item or query, in any form. For example, the search system 118 may present a collection of search result items in a search result section 1004. Alternatively, the search system 118 may deliver a page of information associated with the selected preview item or query. For example, the search system 118 may provide a page that allows the user to purchase or otherwise select an identified movie by the actor Robert Downey Jr. In addition, or alternatively, the user may continue to refine the input query in the query input section 606, in the manner specified above.

FIGS. 11-14 shows processes which summarize the operation of the user interface module 108, in conjunction with the suggestion generating module 110. These processes will be described from the encompassing perspective of the QPS 102.

Figure 11:
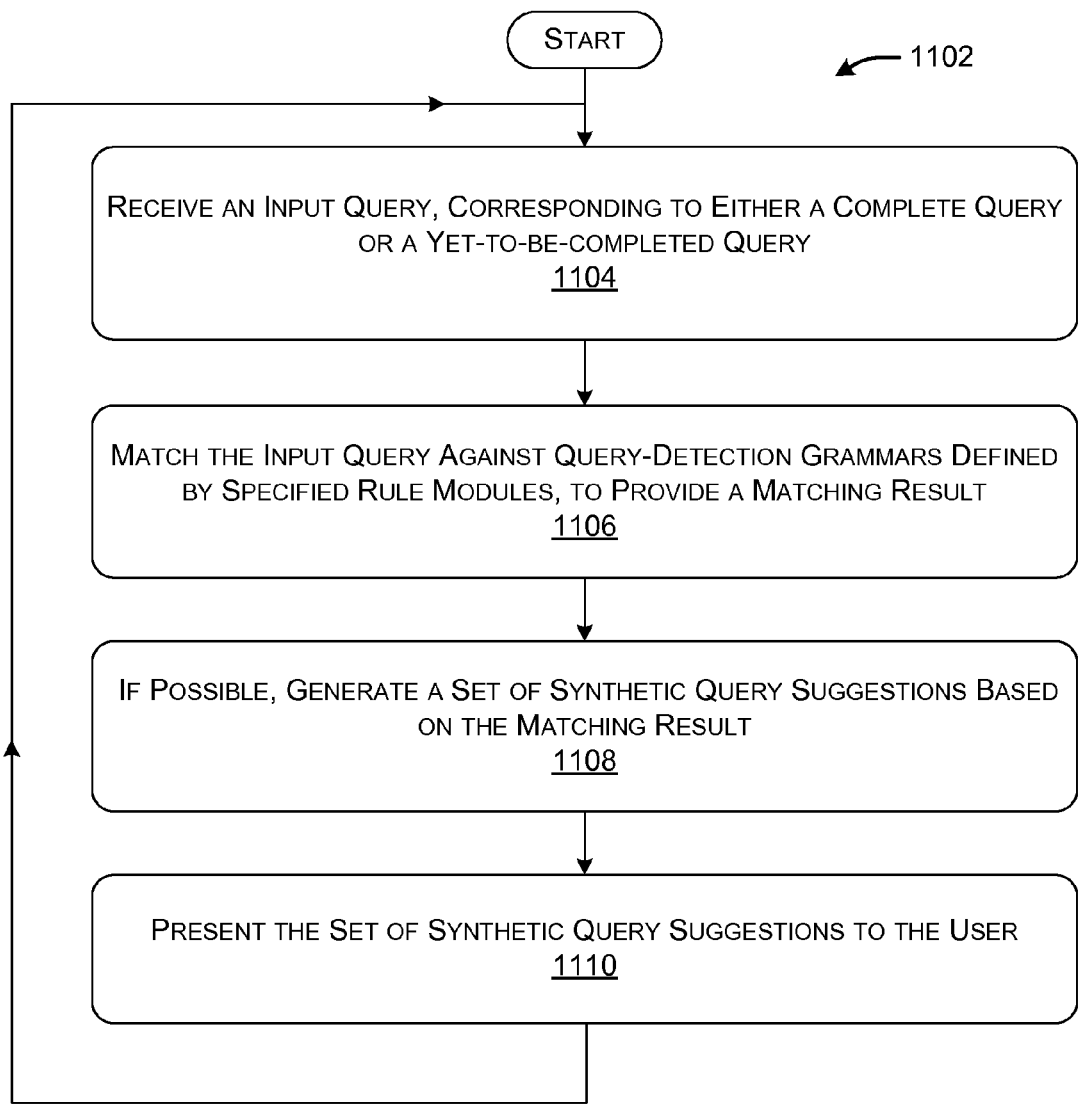
FIG. 11 is a process that describes one manner by which the QPS can generate and present a set of synthetic query suggestions, in response to an input query provided by a user.

Starting with FIG. 11, this figure shows a process 1102 that describes one manner by which the QPS 102 can generate and present a set of synthetic query suggestions, in response to an input query provided by a user. In block 1104, the QPS 102 receives an input query, corresponding to a complete query or a yet-to-be completed query. In block 1106, the QPS 102 matches the input query against query-detection grammars defined by specified rule modules, to provide a matching result. In block 1108, if possible, the QPS 102 generates a set of synthetic query suggestions based on the matching result, and by leveraging query-expression grammars. Although not shown, the QPS 102 can, in addition, or alternatively, generate a set of organic query suggestions. In block 1110, the QPS 102 presents the set of synthetic query suggestions (and/or the organic query suggestions) to the user via an integrated display region of a user interface presentation.

Figure 12:
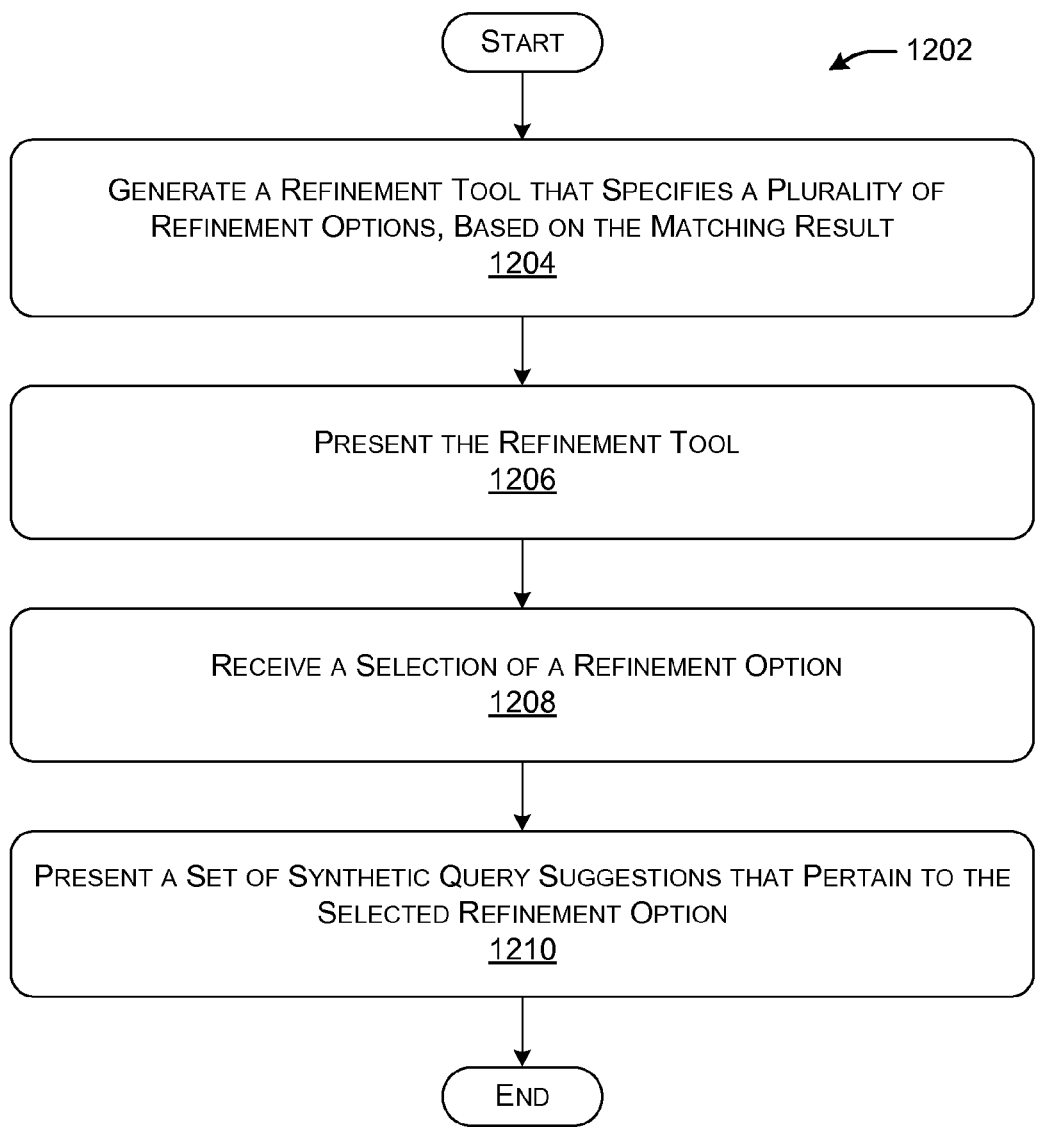
FIG. 12 is a process that describes one manner by which the QPS can generate and present a refinement tool.

FIG. 12 is a process 1202 that describes one manner by which the QPS 102 can generate and present a refinement tool. In block 1204, the QPS 102 generates, at an appropriate juncture, a refinement tool that specifies a plurality of refinement options. As described above, the refinement options are context-specific in the sense that they reflect the matching result generated in block 1106 of FIG. 11. In block 1206, the QPS 102 presents the refinement tool in a refinement section of the user interface presentation. In block 1208, the QPS 102 receives a refinement option selected by the user. In block 12010, the QPS 102 presents another set of synthetic query suggestions (assuming that a previous set has been generated), which pertain to the refinement option selected by the user. The new synthetic query suggestions are more refined than the previous set of synthetic query suggestions.

Figure 13:
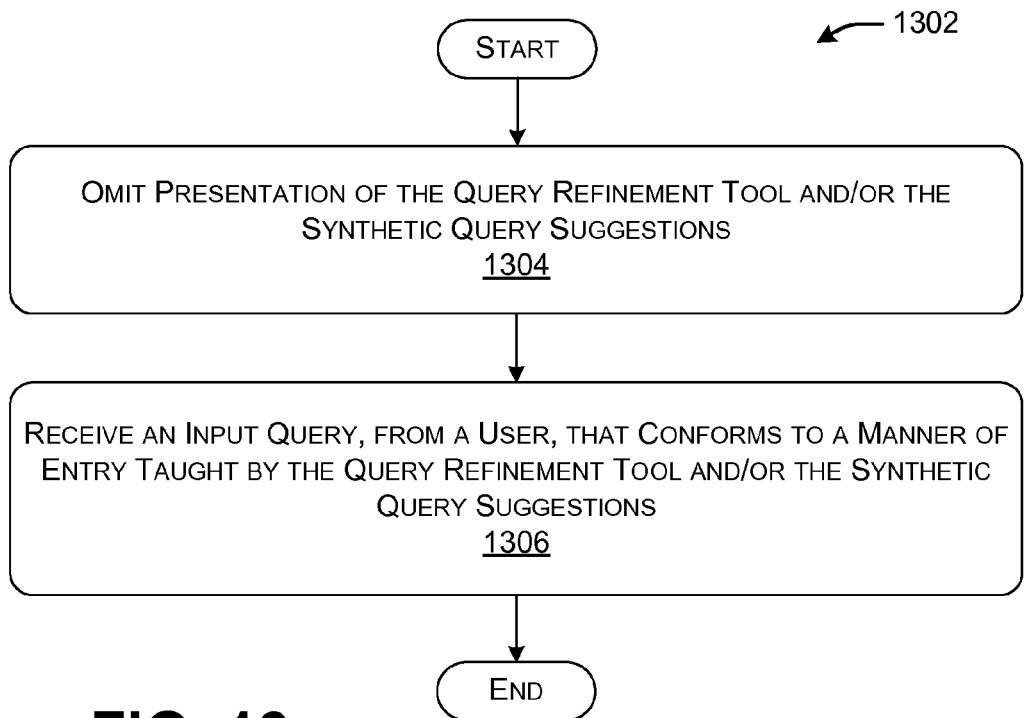
FIG. 13 is a process that describes one manner by which the QPS can train a user in a preferred manner of inputting queries.

FIG. 13 shows a process 1302 which represents the manner in which the QPS 102 can train a user to input queries in a preferred manner. In block 1304, the QPS 102 presents a user interface experience that omits the query refinement tool and/or the synthetic query suggestions. In block 1306, the QPS 102 nevertheless receives the user's entry or modification of an input query in a manner that conforms to the query phrasings and attribute selections previously provided by the suggestion generating module 110. Assume that the user has been trained to input queries in this manner as a result of repeated encounters with the refinement tool and/or the synthetic query suggestions.

Further note that, in one implementation, the search system 118 may generate the same search results regardless of how the user inputs a particular synthetic query suggestion. In a first instance, the user develops a synthetic query suggestion based on the explicit guidance of the QPS 102. In another case, the user enters the same synthetic query suggestion from memory (based on previous interactions with the QPS 102), without being coached by the QPS 102 on the present occasion. The search system 118 can generate the same search results for both cases.

Figure 14:
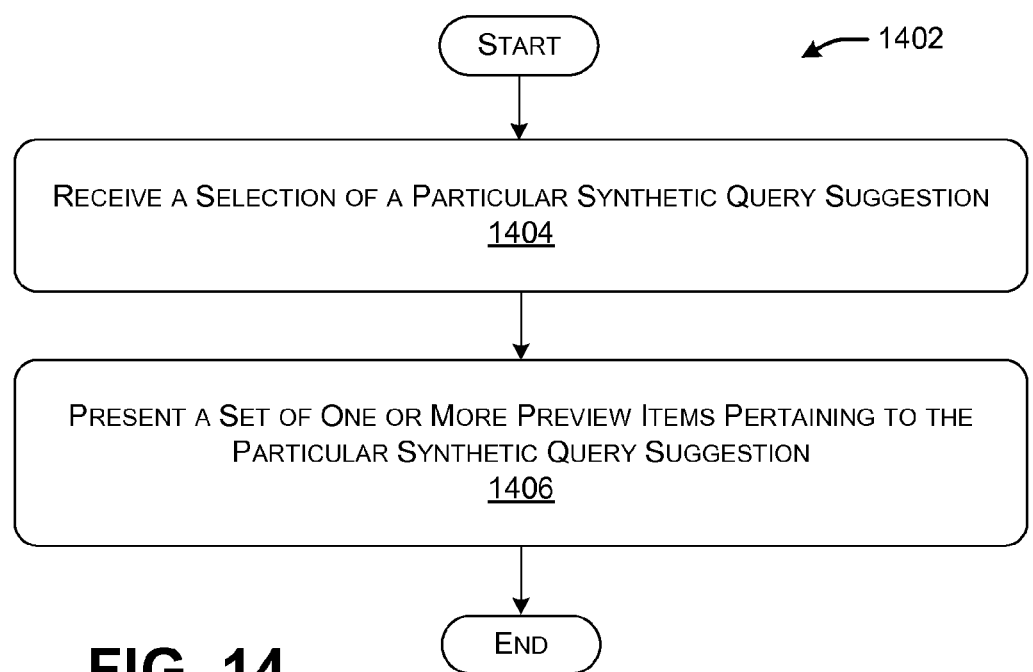
FIG. 14 is a process that describes one manner by which the QPS can generate and present one or more preview items.

Finally, FIG. 14 describes a process 1402 by which the QPS 102 generates one or more preview items in the preview section. That is, in block 1404, the QPS 102 receives the user's selection of a particular synthetic query suggestion. In block 1406, the QPS 102 presents a set of one or more preview items that pertain to the selected synthetic query suggestion. As described in Section A, each preview item and synthetic query suggestion is based on at least one counterpart information item that actually appears in the structured knowledge base. That is, in this implementation, the user will not receive synthetic query suggestions or preview items that are not backed by actual entries in the structured knowledge base.

C. The Suggestion Generating Module

Figure 15:
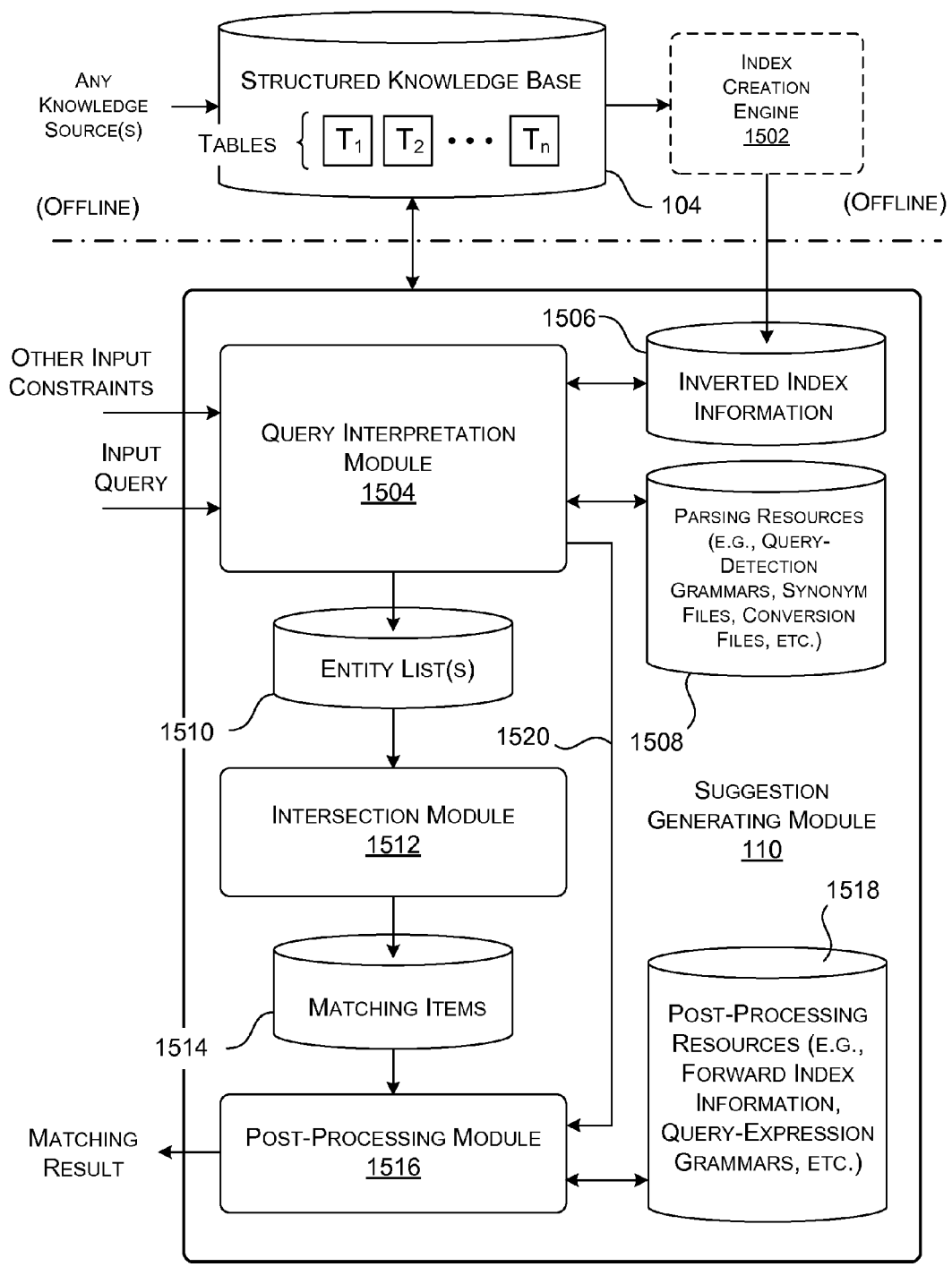
FIG. 15 shows one implementation of a suggestion generating module, which is a component of the QPS of FIG. 1.

FIG. 15 shows one implementation of the suggestion generating module 110. As described in Section A, the suggestion generating module 110 interacts, in part, with the structured knowledge base, provided in the data store 104. Any offline process can be used to create the structured knowledge base. For example, in one case, and administrator can create the structured knowledge base from "scratch," that is, by storing attribute value items in particular locations within the structured knowledge base as they are received or created. In another process, an administrator can extract information items from another repository of information (which may be unstructured or structured), and store those information items in the structured form specified by the knowledge base. For example, in one case, the structured knowledge base may be created by importing the entity items defined by any digital personal assistance service, or the like. That digital personal assistance service, for example, may organize the entity items in a graph data structure.

In other examples, as set forth in Section A, the structured knowledge base may be considered as a master graph that is composed by one or more component graphs. The component graphs may be stored in respective data stores, as maintained by any number of computer systems.

An administrator may also use an index creation engine 1502 to produce inverted index information for the structured knowledge base. The inverted index information specifies, as lookup keys, the attribute value items that appear in the structured knowledge base. For each such attribute value item, the inverted index information identifies the entity items that include the particular attribute value item as an entry. For example, for the attribute value item "science fiction" in FIG. 2, the inverted index information may identify the movie titles which have been assigned this particular genre. "Avatar" is one entity item in that list.

More specifically, in one illustrative implementation, the index creation engine 1502 can store inverted index information for each column of each table. The index creation engine 1502 can also provide a master data structure that can be used to identify the particular tables which store a particular attribute value item. For example, the master data structure can indicate that the attribute value item "off-road" appears in a table devoted to cars, a table devoted to motorcycles, and a table devoted to camping equipment.

As described in Section A, an offline process can also be used to analyze a corpus of previous queries, to generate a collection of query-detection grammars and/or a collection of query-expression grammars. The offline process can use any technique to perform this task, such as a machine-learning mechanism, a statistical pattern-detection mechanism, etc. In addition, or alternatively, an administrator can manually define at least some query-detection grammars and/or query-expression grammars.

In a real time phase of operation, the suggestion generating module 110 may process an input query in plural stages using different respective modules. This section provides an overview of the different modules of the suggestion generating module 110. To begin with, a query interpretation module 1504 analyzes the input query to determine one or more constraints expressed by the query. A constraint constitutes any condition that potentially limits the entries in the structured knowledge base which satisfy the query. For example, a query that simply specifies "automatic transmission" operates as a constraint because it restricts the set of matching entity items to those that contain the attribute-value pair "transmission=automatic." If the user adds the phrase "new" to the query, he or she has added another constraint, insofar as that phrase further limits the set of matching entity items to those which offer a new product, as opposed to a used product.

The suggestion generating module 110 identifies constraints in the input query using the inverted index information provided in a data store 1506, and using parsing resources provided in a data store 1508. The inverted index information was described above. It provides a mechanism for identifying entity items and attribute value items in the structured knowledge base which match specified input terms. For example, in the simple example set forth above, the inverted index information can identify the entity items in the database which contain the attribute-value pair "transmission=automatic." In one (non-limiting) data structure, each such entity item may correspond to a row of the structured knowledge base.

The parsing resources may include a collection of rule modules which define respective query-detection grammars, and which collectively define a master query-detection grammar. The master query-detection grammar corresponds to a complete set of valid (grammatical) queries that can be made, conformant with the rules defined by the rule modules. That set of valid queries may further be conceptualized as a space. For instance, the space may be represented as a hierarchical tree of nodes and branches, a lattice, or other data structure. A particular path through the space defines one particular interpretation that is valid, meaning that it conforms to the rules established by the set of rule modules.

The parsing resources may include other supplemental information, such as one or more synonym files, one or more spelling correction engines, and so on. A synonym file describes synonyms for terms that may appear in the structured knowledge base. For example, synonyms for the attribute value "manual" (in the context of describing a manual transmission) may be "stick shift," "standard," etc. A spelling correction engine provides a mechanism for suggesting alternative spellings of the user's input query.

In operation, the query interpretation module 1504 interprets the input query by selecting one or more paths through a space, defined by the master query-detection grammar Each path defines a possible interpretation of the query. The query interpretation module 1504 may use any technique to perform its search through the space, such as an exhaustive examination of all possible interpretation options, a best-first search strategy (such as the A* search algorithm), and so on. Further, as described in Section A, the query interpretation module 1504 also determines whether each interpretation that implicates a constraint is backed by at least one associated information item in the structured knowledge base. An interpretation that is not supported by the structured knowledge base is not a viable interpretation.

As a result of its analysis, the query interpretation module 1504 generates one or more entity lists, and stores the entity lists in a data store 1510. Each entity list corresponds to a list of one or more entity items that satisfy at least one constraint, where each such entity item also appears in the structured knowledge base. For example, assume that the input query reads, "hatchbacks and bucket seats." A first constraint in this query specifies a set of cars that are characterized as hatchbacks. The entity list for that constraint identifies the set of vehicle-related entity items in the knowledge base that possess the attribute-value pair "back access=hatchback," or the like. A second constraint specifies vehicles having bucket seats. The entity list for that constraint identifies a set of vehicle-related entity items in the knowledge base that possess the attribute-value pair "seat style=bucket," or the like. The query interpretation module 1504 can also generate separate entity lists for different spellings of a term, different synonyms of a term, and so on.

In addition, the query interpretation module 1504 can find those paths through the grammar space which represent the most likely extensions of the user's query (instead of just attempting to interpret the words that the user has provided). For example, assume that the user inputs the query, "Bruce Willis Action movies in." The query interpretation module 1504 may find at least one path through the grammar space that corresponds to the pattern, "Bruce Willis Action movies in 2013," based on a determination that this expanded phrase is a likely completion of the user's query. Another likely extension may correspond to "Bruce Willis Action movies in 3D," and so on. The query interpretation module 1504 can then generate one or more entry lists for each such extended interpretation. These entry lists are predicated, at least in part, on constraints that are not yet explicitly expressed by the user's query, but may be said to be implicitly expressed by the query.

As can therefore be appreciated, in some scenarios, the query interpretation module 1504 can potentially generate a large number of entity lists. Further, many of the entity lists may have a large number of entries.

An intersection module 1512 performs an intersection among sets of entity lists stored in the data store 1510. In many cases the intersection may correspond to an intersection between unions. For example, consider an example in which the user inputs "off-road 5-speed." Assume that "off-road" is associated with two or more spelling and/or synonym variations of this term, along with two or more respective entity lists. Similarly, assume that "5-speed" is associated with two or more spelling and/or synonym variations of this term, along with two or more respective entity lists. The intersection operation corresponds to a conjunction between the first disjunctive combination of entity lists and the second disjunctive combination of entity lists.

The entity items that are produced as a result of an intersection are referred to herein as matching items. A data store 1514 may store the matching items. Each matching item has a combined score that is computed in any application-specific manner, such as the manner specified below. Generally, the score reflects the likelihood that the matching item represents the semantic intent of the user in entering the query.

A post-processing module 1516 presents an output result based on the matching items provided in the data store 1514, using one or more post-processing resources provided in a data store 1518. For example, the post-processing module 1516 can use forward index information to retrieve additional information regarding each of the matching items in the data store 1514. For example, the post-processing module 1516 can retrieve the attribute value items associated with each matching entity item, along with accepted synonyms of those attribute value items. The post-processing module 1516 can also identify and apply appropriate query-expression grammars (provided in the data store 1518) in the manner described in Section A, to produce one or more synthetic query suggestions. The post-processing module 1516 can also identify attribute items and attribute value items that are associated with the top-ranking entity items and/or matching rule modules; the user interface module 108 can use that information to construct the refinement options in the refinement tool, in the manner described in Section A.

Figure 16:
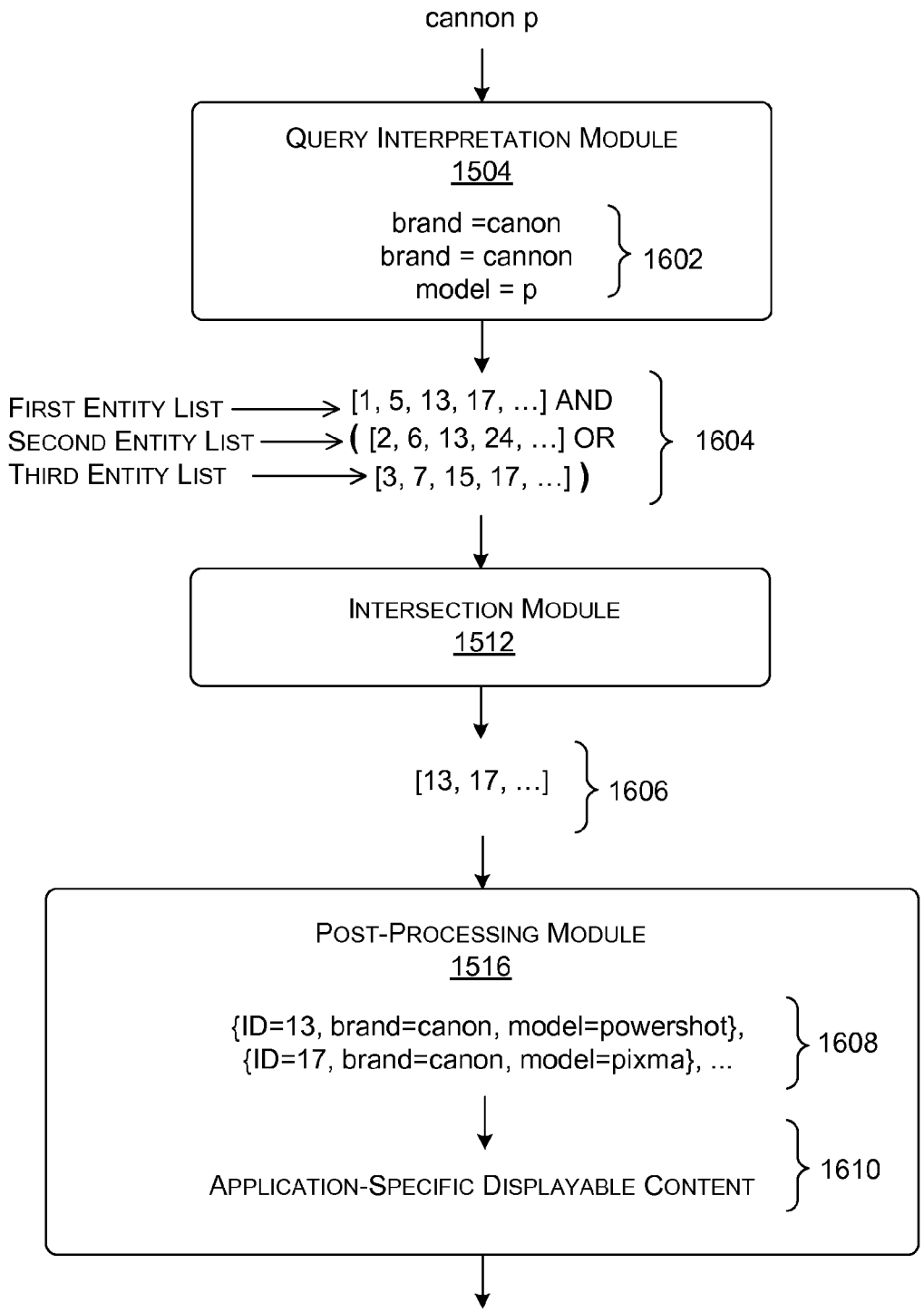
FIG. 16 shows a simplified example of one manner of operation of the suggestion generating module of FIG. 15.

FIG. 16 presents a simplified example of the operation of the suggestion generating module 110 of FIG. 15. Assume here that, at particular juncture, the user has inputted the query "cannon p," with the intent of obtaining information about a camera produced by the camera manufacturer Canon Inc., which begins with the letter "p". In other words, the user has misspelled the name of the manufacturer as "Cannon," when it should appear as "Canon," and the user has not yet completed typing out the name of the model name.

The query interpretation module 1504 explores at least three constraints 1602 in the query. The first constraint specifies that the name of the brand is "cannon." The second constraint specifies that the name of the brand is, alternatively, "canon." And the third constraint indicates that the model name starts with the letter "p". Although not expressly illustrated, the query interpretation module 1504 fans out the prefix "p" into a series of extended prefixes, such as "pa," "pi," "po," "pu," and "py," each operating as sub-constraints in their own right.

The query interpretation module 1504 generates a set of entity lists 1604 that reflect the constraints. More specifically, the first entity list corresponds to the constraint "brand=canon." The second entity list describes entity items that match the extended prefix "po". The third entity list describes entry items that match the extended prefix "pi". Assume that the constraint "brand=cannon" does not match any entity items in the knowledge base, and therefore there is no entity list corresponding to this interpretation (although, in another scenario, it is possible that there could be). Similarly, the other extended prefixes do not match any entity items in the knowledge base.

The intersection module 1512 performs an intersection between the first entity list and the second entity list, and between the first entity list and the third entity list. This yields a set of matching items 1606. For example, the common entry item No. 13 appears in both the first and second entity lists, and therefore qualifies as a matching item. The common entry item No. 17 appears in the first and third entity lists, and therefore qualifies as another matching item. Although not illustrated, the two matching items include respective combined scores which convey how closely they are purported to match the user's search intent.

The post-processing module 1516 uses the forward index information to retrieve additional information 1608 regarding matching item Nos. 13 and 17. The post-processing module 1516 then generates any output result 1610 which may take into account any information imparted by the information 1608 and the original query, among other possible information items.

Additional information will now be presented regarding the operation of the query interpretation module 1504, according to one implementation of that module. As stated above, the query interpretation module 1504 operates by determining a set of the most likely paths through a space, defined by the master query-detection grammar Each such path represents a complete candidate interpretation of the input query, and may encompass an extension of the input query (beyond what the user has currently specified). Any node along any such path represents a partial set of conclusions regarding an interpretation of the query. Further, any child node along a path, relative to a preceding parent node, represents a further refinement in the interpretation, relative to the preceding, parent, interpretation. In choosing how to refine an interpretation, the query interpretation module 1504 is faced with the task of choosing among different possible candidate interpretations. The query interpretation module 1504 examines several factors in making this decision.

First, the query interpretation module 1504 can determine whether a candidate interpretation is applicable to the current input query—or, in other words, whether the interpretation is grammatical or legal. Assume that the candidate interpretation under consideration is associated with a particular rule module. And further assume that the rule module specifies a query-detection pattern that is expected to be present in the input query, in order for the rule module to be properly applied to the input query. The query interpretation module 1504 can determine whether an interpretation is valid, in part, by determining whether the input query includes words that match the pattern specified in the associated rule module.

Assuming that the interpretation is legal, the query interpretation module 1504 may then take into consideration one or more scores that indicate the appropriateness of the interpretation. For example, the query interpretation module 1504 can take into consideration applicable entity scores specified in the knowledge base. Consider an illustrative query, part of which specifies the name "Mt. Spokane." The query interpretation module 1504 may determine that a place-finding rule module applies to this query, which, in turn, operates in conjunction with a table of place names. The query interpretation module 1504 can then examine the table of place names in the knowledge base to determine whether it actually contains such an entity item. If the knowledge base includes this entry, the query interpretation module 1504 can extract the entity score associated with the entry. As previously described, the entity score may reflect the popularity of an entity item, established in any manner. For example, for the entity score for the term "Mt. Spokane" may reflect how many times users have searched this term via a commercial search engine. A candidate interpretation having an underlying popular entity score is more probable, relative to an interpretation having an underlying unpopular entity score.

The query interpretation module 1504 can also consider other scores in determining the appropriateness of a candidate interpretation. In another case, the space defined by the grammar may annotate each transition, from one node to the next, with a grammar probability value that defines the likelihood of that transition. When choosing a particular candidate interpretation, relatively to a parent context, the query interpretation module 1504 can take the probability value of that transition into account. That probability score may reflect, among other factors, the frequency at which this transition appears in previously-submitted queries. An offline engine can compute the probability values for all transitions in the space based on a training corpus of queries.

In addition, or alternatively, the query interpretation module 1504 can assign one or more penalty scores to a candidate interpretation, if applicable. For example, assume that the user inputs "Suzooki" instead of the canonical name of the manufacturer, "Suzuki." Further assume that the name "Suzooki" corresponds to valid manufacturer name, although not the intended manufacturer name. The query interpretation module 1504 can consider both terms "Suzooki" and "Suzuki" as possible interpretations of the user's input query. But the query interpretation module 1504 can assign a penalty score to "Suzuki," because it varies from the term that the user actually specified.

More precisely stated, note that a particular interpretation of an input query may occur in the nested context of one or more prior assumptions about the input query, as it currently exists. As such, the score assigned to any candidate interpretation may also reflect the scores associated with previous interpretations on which the current candidate interpretation depends. Such parent-level or ancestor level scores may incorporate any type of scores described above, such as entity scores (reflecting the popularity of entities), grammar probability scores, penalty scores (associated with spelling correction, synonym replacement, etc.), and so on. In one example, a child-level interpretation can take into consideration parent-level (or ancestor-level) penalty scores by adding those scores to whatever incremental scores are associated with the child-level interpretation, to produce final scores.

With respect to the specific topic of penalty scores, the query interpretation module 1504 can compute these values in any application-specific manner. For example, a spelling correction engine (not shown) can determine the number of changes that need to be made to transform one form of a word into another form of the word. The spelling correction engine can then assign a penalty score which depends on the number of changes that need to be made. Further, as stated above, when considering a particular interpretation, the query interpretation module 1504 can consider the penalty scores of any parent and/or ancestor interpretations, on which the current interpretation is predicated. These parent-level and/or ancestor-level scores carry forward into a determination of the penalty score of the interpretation currently under consideration.

Each matching item produced by the intersection module 1512 has a combined score. The combined score may depend on any of the scores described above. For example, again consider the simplified example in FIG. 16. The matching item for entity item No. 13 originates from the intersection of the first entity list and the second entity list in the set of entity lists 1604. Assume that the entity item No 13 has an entity score x, the first entity list has a score y, and the second entity list has a score z. The combined score of the matching item, for item No. 13, may correspond to the sum of these scores, e.g., x+y+z, or some weighted combination of these scores. Here, a high score indicates a desirable score, but this is a matter of application-specific convention; instead, a low score could represent a desirable outcome.

As stated above, an entity score may correspond to the popularity level of the entity item, assessed in any manner. A desirable (high) entity score may correspond to an entity in which many people have previously expressed an interest. Although not represented in the above example, the combined score can also take into account a weight applied to the entity item, having any application-specific connotation.

The penalty score of an entity list may generally reflect the degree to which the matching term, on which the entity list is predicated, varies from the originally-specified counterpart of that term, as it appears in the input query. A desirable penalty score may indicate that the input term has not been significantly altered. For example, assume that a match with an entity item is procured by first performing spelling correction on the input term and/or by choosing a synonym of the entity item; the entity list, associated with the matching entity item, would be assigned a less favorable penalty score compared to the case in which no modification of the input term was performed to procure the match. The penalty score may be computed in the manner described earlier, or in any other application-specific manner.

Figure 17:
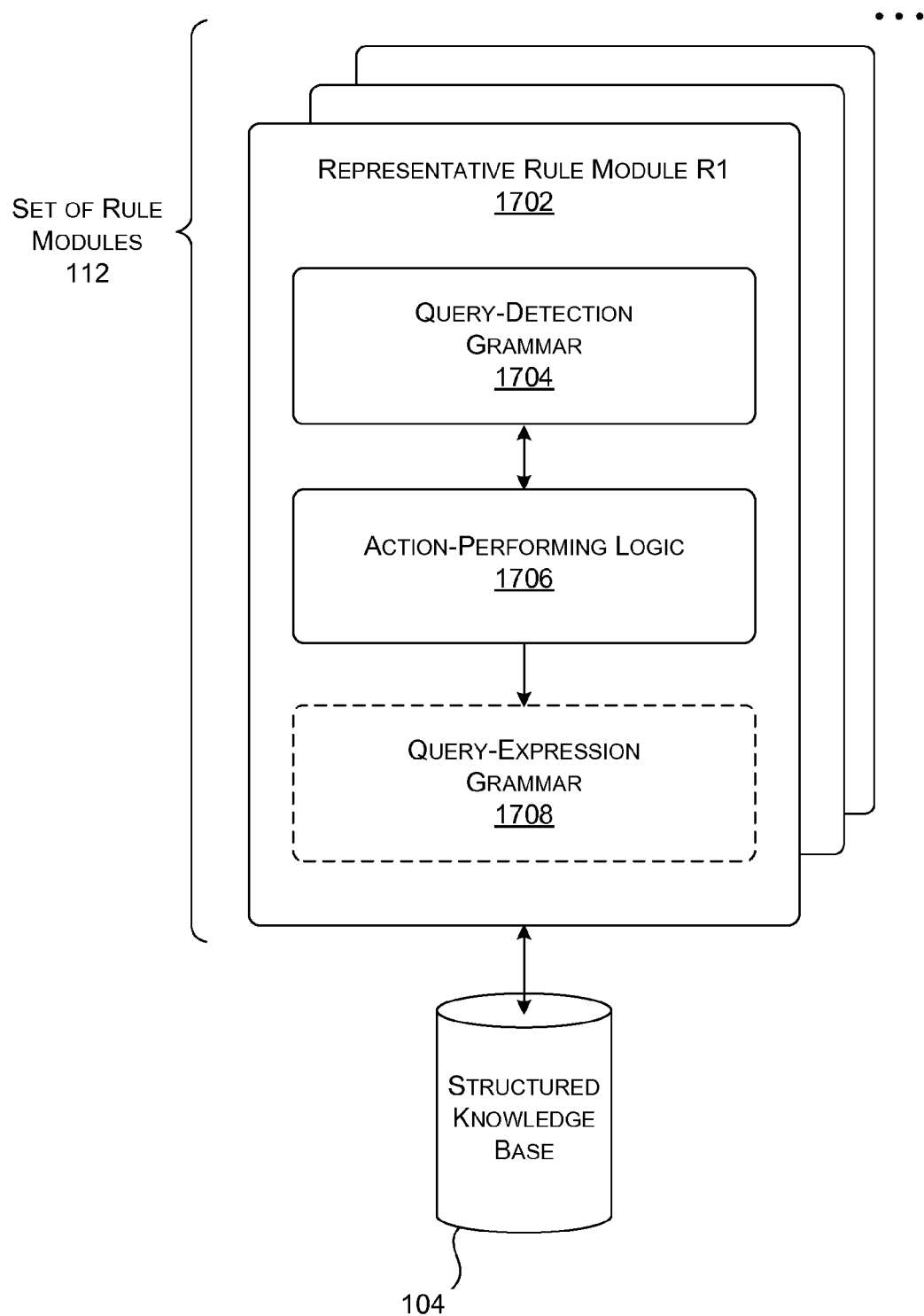
FIG. 17 shows a collection of rule modules with which the suggestion generating module may interact.

Advancing to FIG. 17, this figure is a logical depiction of a particular rule module 1702, which corresponds to one rule module among the set of rule modules 112. To repeat, the collection of rule modules 112 collectively defines a space of legal queries that conform to a master query-detection grammar.

The rule module 1702 may include logic for detecting a circumstance that triggers the application of the rule module 1702, referred to as a query-detection grammar 1704. The query-detection grammar 1704 may specify a pattern in any manner, such as by specifying the text that will trigger the application of the rule. The query interpretation module 1504 can compare that text against the query using any parsing method, e.g., using a Regex mechanism or the like. The pattern-detection logic 1704 can also specify the technique to be used to detect the pattern. The rule module 1702 may also include logic for executing prescribed behavior when the rule module has been triggered, referred to as action-performing logic 1706. For example, the action-performing logic 1706 can govern the manner in which the query interpretation module 1504 interrogates the structured knowledge base, to determine whether an interpretation, associated with the rule module 1702, is backed by one or more information items in the structured knowledge base.

The rule module 1702 can also include, or may be otherwise associated with, a query-expression grammar 1708. As described in Section A, the query-expression grammar 1708 may correspond to a template for use in generating one or more synthetic query suggestions, upon the application of the rule module 1702. In other cases, the query-expression grammar 1708 may be decoupled from the rule modules. In some cases, the query-detection grammar 1704 is the same, or related to, the query-expression grammar 1706.

Different factors may trigger the application of the query-expression grammar 1708. In one case, the suggestion generating module 110 may invoke the query-expression grammar 1706 when the corresponding query-detection grammar 1704 has been used to interpret an input query. In another case, the suggestion generating module 110 can invoke the query-expression grammar 1708 based on the nature of the results that are retrieved (or will be retrieved) from the structured knowledge base by the action-performing logic 1706. For example, if the results pertain to a movie and a movie actor, the suggestion generating module 110 can retrieve a query-expression grammar 108 that is suitable for formulating a synthetic query suggestion, based on those input fields.

The suggestion generating module 110 can incorporate yet other features, such as features described in co-pending and commonly assigned U.S. application Ser. No. 13/166,969 to Bo-June Hsu, et al., filed on Jun. 23, 2011, and entitled "Interactive Semantic Query Suggestion for Content Search," and U.S. application Ser. No. 14/221,526, to Jeremy R. Espenshade, et al., filed on an even date herewith, and entitled "Query Interpretation and Suggestion Generation under Various Constraints." Both of these applications are incorporated by reference herein in their respective entireties.

D. Illustrative Computing Functionality

FIG. 18 shows computing functionality 1802 that can be used to implement any aspect of QPS 102 of FIG. 1. For instance, the type of computing functionality 1802 shown in FIG. 18 can be used to implement any aspect of the local computing functionality (302, 402) of FIGS. 3 and 4, and/or the remote computing functionality 404 of FIG. 4. In all cases, the computing functionality 1802 represents one or more physical and tangible processing mechanisms.

The computing functionality 1802 can include one or more processing devices 1804, such as one or more central processing units (CPUs), and/or one or more graphical processing units (GPUs), and so on.

The computing functionality 1802 can also include any storage resources 1806 for storing any kind of information, such as code, settings, data, etc. Without limitation, for instance, the storage resources 1806 may include any of: RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 1802. The computing functionality 1802 may perform any of the functions described above when the processing devices 1804 carry out instructions stored in any storage resource or combination of storage resources.

As to terminology, any of the storage resources 1806, or any combination of the storage resources 1806, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1802 also includes one or more drive mechanisms 1808 for interacting with any storage resource, such as a hard disk drive mechanism, an optical disk drive mechanism, and so on.

The computing functionality 1802 also includes an input/output module 1810 for receiving various inputs (via input devices 1812), and for providing various outputs (via output devices 1814). The input devices 1812 can include any of key entry devices, mouse entry devices, touch-enabled entry devices, voice entry devices, and so on. One particular output mechanism may include a presentation device 1816 and an associated graphical user interface (GUI) 1818. The computing functionality 1802 can also include one or more network interfaces 1820 for exchanging data with other devices via one or more networks 1822. One or more communication buses 1824 communicatively couple the above-described components together.

The network(s) 1822 can be implemented in any manner, e.g., by a local area network, a wide area network (e.g., the Internet), point-to-point connections, etc., or any combination thereof. The network(s) 1822 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1802 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the functionality described above can employ various mechanisms to ensure the privacy of user data maintained by the functionality, in accordance with user expectations and applicable laws of relevant jurisdictions. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute a representation that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by one or more computing devices, for processing queries, comprising:
   receiving an input query, corresponding to a complete query or a yet-to-be-completed query;
   matching the input query against query-detection grammars defined by respective rule modules, with reference to a structured knowledge base, to generate a matching result;
   generating a first set of one or more synthetic query suggestions based on the matching result;
   presenting the first set of synthetic query suggestions;
   in response to the input query, or a later modification of the input query, further generating a query refinement tool, the query refinement tool specifying a plurality of refinement options;
   presenting the query refinement tool;

receiving a selection of a refinement option identified by the query refinement tool; and in response to the selection, presenting a second set of one or more synthetic query suggestions, the second set of synthetic query suggestions being more refined compared to the first set of synthetic query suggestions, each synthetic query suggestion in the first set and the second set:

being predicated on one or more matching query-expression grammars, being formed as an expressive natural language modification of an input query, and pertaining to at least one information item contained in the structured knowledge base.

2. The method of claim 1, wherein input queries are received via a query input section of a user interface presentation, wherein each set of synthetic query suggestions is presented via a suggestion section of the user interface presentation, and wherein the query refinement tool is presented via a tool section of the user interface presentation.

3. The method of claim 2, wherein the query input section, the suggestion section, and the tool section of the user interface presentation are associated with an integrated input region of the user interface presentation.

4. The method of claim 2, wherein the tool section corresponds to a bar that is positioned adjacent to the query input section.

5. The method of claim 1, further comprising:

generating at least one organic query suggestion that is based on at least one previous query submitted by one or more previous users; and presenting said at least one organic query suggestion along with at least one synthetic query suggestion.

6. The method of claim 5, further comprising presenting information which distinguishes said at least one organic query suggestion from said at least one synthetic query suggestion.

7. The method of claim 5, further comprising presenting said at least one organic query suggestion along with said at least one synthetic query suggestion without distinguishing said at least one organic query suggestion from said at least one synthetic query suggestion.

8. The method of claim 5, further comprising providing the second set of synthetic query suggestions without presenting any organic query suggestions.

9. The method of claim 1, further comprising:

receiving a selection of a particular synthetic query suggestion; and presenting a set of one or more preview items pertaining to the particular synthetic query suggestion, each preview item corresponding to an information item, in the structured knowledge base, which corresponds to the particular synthetic query suggestion.

10. The method of claim 9, wherein input queries are received via a query input section of a user interface presentation, wherein each set of synthetic query suggestions is presented via a suggestion section of the user interface presentation, wherein the set of one or more preview items are presented via a preview section of the user interface presentation, and wherein the query input section, the suggestion section, and the preview section of the user interface presentation are associated with an integrated input region of the user interface presentation.

11. The method of claim 1, further comprising, on a subsequent occasion:

omitting presentation of the query refinement tool and/or the synthetic query suggestions; and receiving a modification of an input query, from a user, that conforms to a manner of modification that would be produced through the use of the query refinement tool and/or the synthetic query suggestions, based on information learned through at least one previous presentation of the query refinement tool and/or the synthetic query suggestions.

12. The method of claim 1, further comprising performing a search based on a specified synthetic query suggestion, the search being based, in part, on information extracted from the structured knowledge base, which pertains to the specified synthetic query suggestion.

13. The method of claim 1, wherein the structured knowledge base provides a graph that describes a plurality of information items and relationships among the information items, and wherein the graph is composed of two or more component graphs, maintained in two or more respective data stores.

14. A computer readable storage medium for storing computer readable instructions, the computer readable instructions performing a method, when executed by one or more processing devices, that comprises:

receiving an input query, corresponding to a complete query or a yet-to-be-completed query;

matching the input query against query-detection grammars defined by respective rule modules, with reference to a structured knowledge base, to generate a matching result;

generating a first set of one or more synthetic query suggestions based on the matching result;

presenting the first set of synthetic query suggestions;

in response to the input query, or a later modification of the input query, further generating a query refinement tool, the query refinement tool specifying a plurality of refinement options;

presenting the query refinement tool;

receiving a selection of a refinement option identified by the query refinement tool; and in response to the selection, presenting a second set of one or more synthetic query suggestions, the second set of synthetic query suggestions being more refined compared to the first set of synthetic query suggestions, each synthetic query suggestion in the first set and the second set:

being predicated on one or more matching query-expression grammars, being formed as an expressive natural language modification of an input query, and pertaining to at least one information item contained in the structured knowledge base.

15. The computer readable storage medium of claim 14, wherein the method further comprises:

generating at least one organic query suggestion that is based on at least one previous query submitted by one or more previous users; and presenting said at least one organic query suggestion along with at least one synthetic query suggestion.

16. The computer readable storage medium of claim 15, wherein the method further comprises presenting information which distinguishes said at least one organic query suggestion from said at least one synthetic query suggestion.

17. The computer readable storage medium of claim 15, wherein the method further comprises presenting said at least one organic query suggestion along with said at least one synthetic query suggestion without distinguishing said at least one organic query suggestion from said at least one synthetic query suggestion.

18. The computer readable storage medium of claim 14, wherein the method further comprises:
   receiving a selection of a particular synthetic query suggestion; and
   presenting a set of one or more preview items pertaining to the particular synthetic query suggestion,
   each preview item corresponding to an information item, in the structured knowledge base, which corresponds to the particular synthetic query suggestion.

19. A device comprising:
a processor; and
executable instructions operable by the processor, the executable instructions comprising a method for processing queries, the method comprising:
   receiving an input query, corresponding to a complete query or a yet-to-be-completed query;
   matching the input query against query-detection grammars defined by respective rule modules, with reference to a structured knowledge base, to generate a matching result;
   generating a first set of one or more synthetic query suggestions based on the matching result;
   presenting the first set of synthetic query suggestions;
   in response to the input query, or a later modification of the input query, further generating a query refinement tool, the query refinement tool specifying a plurality of refinement options;
   presenting the query refinement tool;
   receiving a selection of a refinement option identified by the query refinement tool; and
   in response to the selection, presenting a second set of one or more synthetic query suggestions, the second set of synthetic query suggestions being more refined compared to the first set of synthetic query suggestions,
   each synthetic query suggestion in the first set and the second set:
      being predicated on one or more matching query-expression grammars,
      being formed as an expressive natural language modification of an input query, and
      pertaining to at least one information item contained in the structured knowledge base.

20. The device of claim 19,
wherein input queries are received via a query input section of a user interface presentation,
wherein each set of synthetic query suggestions is presented via a suggestion section of the user interface presentation, and
wherein the query refinement tool is presented via a tool section of the user interface presentation.

* * * * *